US008488946B2

(12) United States Patent
Fujii et al.

(10) Patent No.: US 8,488,946 B2
(45) Date of Patent: Jul. 16, 2013

(54) REPRODUCING APPARATUS, REPRODUCING METHOD AND REPRODUCING COMPUTER PROGRAM PRODUCT

(75) Inventors: So Fujii, Tokyo (JP); Takafumi Azuma, Tokyo (JP)

(73) Assignee: Sony Corporation, Tokyo (JP)

( * ) Notice: Subject to any disclaimer, the term of this patent is extended or adjusted under 35 U.S.C. 154(b) by 1446 days.

(21) Appl. No.: 12/094,413

(22) PCT Filed: Sep. 21, 2007

(86) PCT No.: PCT/JP2007/069127
§ 371 (c)(1),
(2), (4) Date: May 21, 2008

(87) PCT Pub. No.: WO2008/035821
PCT Pub. Date: Mar. 27, 2008

(65) Prior Publication Data
US 2008/0304814 A1 Dec. 11, 2008

(30) Foreign Application Priority Data
Sep. 21, 2006 (JP) ................................ 2006-256540

(51) Int. Cl.
H04L 29/06 (2006.01)
(52) U.S. Cl.
USPC ............................ 386/326; 386/353; 715/840

(58) Field of Classification Search
USPC ........................... 715/840; 386/126, 326, 353
See application file for complete search history.

(56) References Cited

U.S. PATENT DOCUMENTS

| 7,801,421 B2* | 9/2010 | Seo et al. ....................... 386/241 |
| 2005/0028197 A1 | 2/2005 | White et al. |
| 2007/0172195 A1* | 7/2007 | Hattori et al. ................... 386/54 |
| 2008/0126993 A1* | 5/2008 | Fujii et al. ..................... 715/840 |

FOREIGN PATENT DOCUMENTS

| JP | 10-271453 | 10/1998 |
| SE | 525 817 | 5/2005 |
| WO | 2004 051644 | 6/2004 |

OTHER PUBLICATIONS

Office Action issued Sep. 20, 2011 in Japanese Patent Application No. 2006-256540.

* cited by examiner

Primary Examiner — Brandon Hoffman
Assistant Examiner — Michael D Anderson
(74) Attorney, Agent, or Firm — Oblon, Spivak, McClelland, Maier & Neustadt, L.L.P.

(57) ABSTRACT

An apparatus, computer program product and method provide a mechanism for independently allow a user to pause the display of a video stream from a given source, while also enabling the user to operate a menu function from a data stream from the same source.

16 Claims, 30 Drawing Sheets

Fig. 7

| Syntax | No. of bits | Mnemonic |
| --- | --- | --- |
| xxxxx.mpls { | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for (i=0; i<N1; i++){ | | |
|         padding_word | 16 | bslbf |
|     } | | |
|     PlayList () | | |
|     for (i=0; i<N2; i==) { | | |
|         padding_word | 16 | bslbf |
|     } | | |
|     PlayListMark () | | |
|     for (i=0; i<N3; i++) { | | |
|         padding_word | 16 | bslbf |
|     } | | |
|     extensionData () | | |
|     for (i=0; i<N4; i++) { | | |
|         padding_word | 16 | bslbf |
|     } | | |
| } | | |

*Fig. 8*

PlayList-Syntax

| Syntax | No. of bits | Mnemonic |
|---|---|---|
| PlayList () { | | |
|     length | 32 | uimsbf |
|     reserved_for_future_use | 16 | bslbf |
|     number_of_PlayItems | 16 | uimsbf |
|     number_of_SubPaths | 16 | uimsbf |
|     for (PlayItems_id=0;<br>        PlayItem_id<number_of_PlayItems;<br>        PlayItems_id++) { | | |
|         PlayItem () | | |
|     } | | |
|     for (SubPath_id+0;<br>        SubPath_id<number_of_SubPaths;<br>        SubPath_id++) { | | |
|         SubPath () | | |
|     } | | |
| } | | |

Fig. 9A

| Syntax | No. of bits | Mnemonic |
|---|---|---|
| PlayItem () { | | |
|   length | 16 | uimsbf |
|   Clip_Information_file_name[0]   //angle_id=0 | 8*5 | bslbf |
|   Clip_codec_identifier [0] | 8*4 | bslbf |
|   reserved_for_future_use | 11 | bslbf |
|   is_multi_angle | 1 | bslbf |
|   connection_condition | 4 | bslbf |
|   ref_to_STC_id[0] | 8 | uimsbf |
|   IN_time | 32 | uimsbf |
|   OUT_time | 32 | uimsbf |
|   UO_mask_table() | | |
|   PlayItem_random_access_flag | 1 | bslbf |
|   reserved_for_future_use | 7 | bslbf |
|   still_mode | 8 | bslbf |
|   if(still_mode==0x01) { | | |
|     still_time | 16 | uimsbf |
|   } else { | | |

*Fig. 9B*

| | | | |
|---|---|---|---|
| reserved_for_future_use | | 16 | bslbf |
| } | | | |
| if(is_multi_angle=1b) { | | | |
| multi_clip_entries() { | | | |
| number_of_angles | | 8 | uimsbf |
| reserved_for_future_use | | 6 | bslbf |
| is_different_audios | | 1 | bslbf |
| is_seamless_angle_change | | 1 | bslbf |
| for (angle_id=1;//Note:angles except angle_id=0 angle_id<number_of_angles;angle_id++) { | | | |
| Clip_information_file_name[angle_id] | | 8*5 | bslbf |
| Clip_codec_identifier[angle_id] | | 8*4 | bslbf |
| ref_to_STC_id[angle_id] | | 8 | uimsbf |
| } | | | |
| } | | | |
| } | | | |
| STN_table () | | | |
| } | | | |

*Fig. 10A*

STN_table ()

| Syntax | No. of bits | Mnemonic |
|---|---|---|
| STN_table () { | | |
|   length | 16 | uimsbf |
|   reserved_for_future_use | 16 | bslbf |
|   number_of_primary_video_stream_entries | 8 | uimsbf |
|   number_of_primary_audio_stream_entries | 8 | uimsbf |
|   number_of_PG_textST_stream_entries | 8 | uimsbf |
|   number_of_IG_stream_entries | 8 | uimsbf |
|   number_of_secondary_audio_stream_entries | 8 | uimsbf |
|   number_of_secondary_video_stream_entries | 8 | uimsbf |
|   number_of_PiP_PG_textST_stream_entries_puls | 8 | uimsbf |
|   reserved_for_future_use | 40 | bslbf |
|   for (primary_video_stream_id=0; | | |
|     primary_video_stream_id < | | |
|     number_of_primary_video_stream_entries; | | |
|     primary_video_stream_id++) { | | |
|     stream_entry () | | |
|     stream_attributes () | | |

Fig. 10B

```
}
for (primary_audio_stream_id=0;
     primary_audio_stream_id <
     number_of_primary_audio_stream_entries;
     primary_video_stream_id++) {
    stream_entry ()
    stream_attributes ()
}
for (PG_textST_stream_id=0;
     PG_textST_stream_id < number_of_PG_textST_stream_entries;
                          +number_of_PiP_PG_textST_stream_entries_plus;
     PG_textST_stream_id++) {
    stream_entry ()
    stream_attributes ()
}
for (IG_stream_id=0;
     IG_stream_id < number_of_stream_entries;
     IG_stream_id++) {
```

Fig. 10C

| | | | |
|---|---|---|---|
| stream_entry () | | | |
| stream_attributes () | | | |
| for (secondary_audio_stream_id=0 secondary_audio_stream_id < number_of_secondary_audio_stream_entries; secondary_video_stream_id++) { | | | |
| stream_entry () | | | |
| stream_attributes () | | | |
| comb_info Secondary_audio Primary_audio_ () { | | | |
| number_of_primary_audio_ref_entries | 8 | uimsbf | |
| reserve_for_word_align | 8 | bslbf | |
| for (i=0; i<number_of_primary_audio_ref_entries; i++) { | | | |
| primary_audio_stream_id_ref | 8 | uimsbf | |
| } | | | |
| if (number_of_primary_audio_ref_entries%2==1) { | | | |
| reserved_for_word_align | 8 | bslbf | |

Fig. 11A

| | | | | | | | |
|---|---|---|---|---|---|---|---|
| for (secondary_video_stream_id=0; secondary_video_stream_id < number_of_secondary_video_stream_entries; secondary_video_stream_id++) { | | | | | | | |
| stream_entry () | | | | | | | |
| stream_attributes () | | | | | | | |
| comb_info Secondary_video Secondary_audio () { | | | | | | | |
| number of secondary_audio_ref_entries | 8 | uimsbf | | | | | |
| reserved_for_word_align | 8 | bslbf | | | | | |
| for(i=0;i<number_of_secondary_audio_ref_entries;i++) { | | | | | | | |
| secondary_audio_stream_id_ref | 8 | uimsbf | | | | | |
| } | | | | | | | |
| if(number_of_secondary_audio_ref_entries; i%2==1) { | | | | | | | |
| reserved_for_word_align | 8 | bslbf | | | | | |
| } | | | | | | | |
| } | | | | | | | |
| } | | | | | | | |

*Fig. 11B*

| | | |
|---|---|---|
| comb_info_Secondary_PiP_PG_textST() { | | |
| number_of_PiP_PG_textST_ref_entries | 8 | uimsbf |
| reserved_for_word_align | 8 | bslbf |
| for(i=0;i<number_of_PiP_PG_textST_ref_entries;i++) { | | |
| PiP_PG_textST_stream_id_ref | 8 | uimsbf |
| } | | |
| if (number_of_PiP_PG_textST_ref_entries%2==1) { | | |
| reserved_for_word_align | 8 | bslbf |
| } | | |
| } | | |

*Fig. 12*

Stream_entry ()

| Syntax | No. of bits | Mnemonic |
|---|---|---|
| stream_entry (id) { | | |
|     length | 8 | uimsbf |
|     type | 8 | uimsbf |
|     if (type==1) { | | |
|         ref_to_stream_PID_of_mainClip | 16 | uimsbf |
|         reserved_for_future_use | 48 | bslbf |
|     } else if(type==2) { | | |
|         ref_to_SubPath_id | 8 | uimsbf |
|         ref_to_subClip_entry_id | 8 | uimsbf |
|         ref_to_stream_PID_of_subClip | 16 | |
|         reserved_for_future_use | 32 | bslbf |
|     } else if(type==3) { | | |
|         ref_to_SubPath_id | 8 | |
|         ref_to_stream_PID_of_mainClip | 16 | |
|         reserved_for_future_use | 40 | |
|     } | | |
| } | | |

Fig. 13

SudPath-Syntax

| Syntax | No. of bits | Mnemonic |
|---|---|---|
| SudPath () { | | |
|     length | 32 | uimsbf |
|     reserved_for_future_use | 8 | bslbf |
|     SubPath_type | 8 | uimsbf |
|     reserved_for_future_use | 15 | uimsbf |
|     is_repeat_SubPath | 1 | bslbf |
|     reserved_for_future_use | 8 | bslbf |
|     number_of_SubPlayItems | 8 | uimsbf |
|     for (i=0; i < number_of_SubPlayItems; i++) { | | |
|         SubPlayItem(i) | | |
|     } | | |
| } | | |

Fig. 14A

SubPlayItem(i)-Syntax

| Syntax | No. of bits | Mnemonic |
|---|---|---|
| SubPlayItem(i) { | | |
| length | 16 | uimsbf |
| Clip_information_file_name [0] | 8*5 | bslbf |
| Clip_codec_identifier [0]   //subclip_entry_id=0 | 8*4 | uimsbf |
| reserved for future use | 31 | uimsbf |
| is_multi_Clip_entries | 1 | bslbf |
| ref_to_STC_id [0] | 8 | bslbf |
| SubPlayItem_IN_time | 32 | uimsbf |
| SubPlayItem_OUT_time | 32 | uimsbf |
| sync_PlayItem_id | 16 | uimsbf |
| sync_start_PTS_of_PlayItem | 32 | uimsbf |
| if(is_multi_Clip_entries==1b) { | | |

*Fig. 14B*

| | | |
|---|---|---|
| reserved_for_future_use | 8 | bslbf |
| num_of_Clip_entries | 8 | uimsbf |
| for (subclip_entry_id=1;//Note:Entries after subclip_entry_id=0 subclip_entry_id<num_of_Clip_entries;subclip_entryid ++) { | | |
| Clip_Information_file_name[subclip_entry_id] | 8*5 | bslbf |
| Clip_codec_Identifier[subclip_entry_id] | 8*4 | bslbf |
| ref_to_STC_id[subclip_entry_id] | 8 | uimsbf |
| reserved_for_future_use | 8 | bslbf |
| } | | |

*Fig. 15A*

SubPath_type

| SubPath_typt | Meaning |
|---|---|
| 0 | reserved |
| 1 | reserved |
| 2 | Out-of-mux and primary audio presentation path of the Browsable slideshow<br>(The audio presentation path using the SubPath is not synchronized with the main path using PlayItem in the PlayList.) |
| 3 | Out_of_mux and interactive graphics menu<br>(The interactive graphics menu using the SubPath is not synchronized with the main path using PlayItems in the PlayList.) |
| 4 | Out-of-mux and text subtitle presentation path<br>(The text subtitle presentation path using the Subpath is synchronized with the main path using PlayItems in the PlayList.) |
| 5 | Out-of-mux and AV synchronized type of one or more elementary streams path<br>(Primary audio/PG/IG/Secondary audio paths.<br><br>Out-of-mux and AV synchronized type of Picture-in-Picture presentation path which contains one or more elementaty stream paths.<br><br>(The elementary streams used by the path are multiplexed in a separate Clip from other Clip used by playItem. The path using the SubPath is synchronized with the main path using PlayItems in the PlayList.) |

Fig. 15B

| 6 | Out-fo-mux and AV non-synchronized type or Picture-inPicture presentation path which contains one or more elementary stream paths.<br><br>(The elementary streams used by the path are multiplexed in a separate Clip from other Clip used by PlayItem. The path using the SubPath is not synchronized with the main path using PlayItems in the PlayList.) |
|---|---|
| 7 | In-mux type of AV synchronized type of Picture-inPicture presentation path which contains one or more elementary stream paths.<br><br>(The elementary streams used by the path is muitiplexed in the same Clip used by PlayItem. The path using the SubPath is synchronized with the main path using PlayItems in the PlayList.) |
|   | reserved |

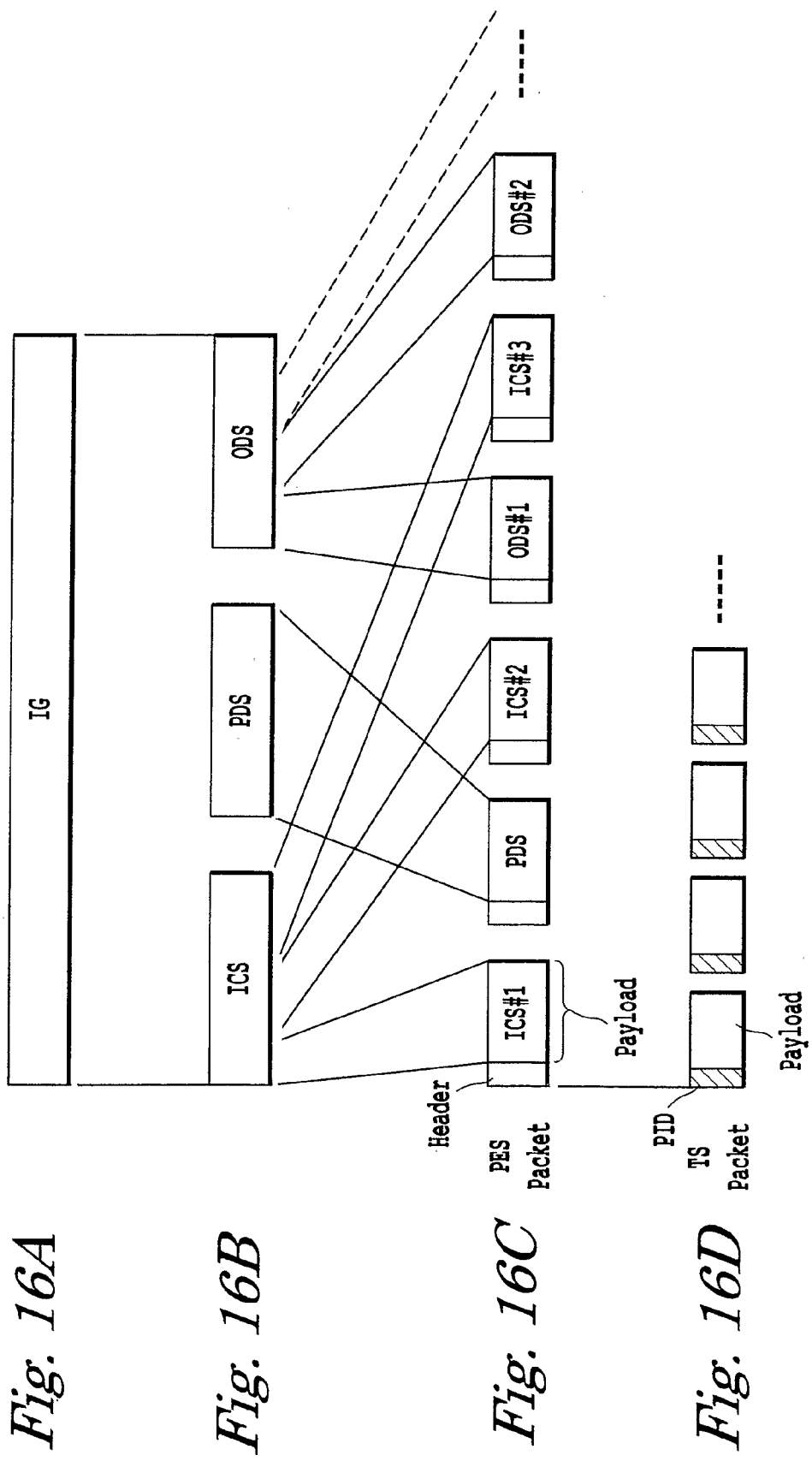

Fig. 17

| (Syntax) | Data length (bit) | Mnemonic |
|---|---|---|
| interactive_composition_segment() { | | |
|     segment_descriptor() | | |
|     video_descriptor() | | |
|     composition_descriptor() | | |
|     sequence_descriptor() | | |
|     interactive_composition_data_fragment() | | |
| } | | |

Fig. 18

| (Syntax) | Data length (bit) | Mnemonic |
|---|---|---|
| interactive_composition() { | | |
|     interactive_composition_length | 24 | uimsbf |
|     stream_model | 1 | bslbf |
|     user_interface_model | 1 | bslbf |
|     Reserved | 6 | bslbf |
|     if (stream_model == '0$_b$') { | | |
|         Reserved | 8 | bslbf |
|         composition_time_out_pts | 33 | uimsbf |
|         Reserved | 7 | bslbf |
|         selection_time_out_pts | 33 | uimsbf |
|     } | | |
|     user_time_out_duration | 24 | uimsbf |
|     number_of_pages | 8 | uimsbf |
|     for (i=0; i<number_of_pages; i++) { | | |
|         page() | | |
|     } | | |
| } | | |

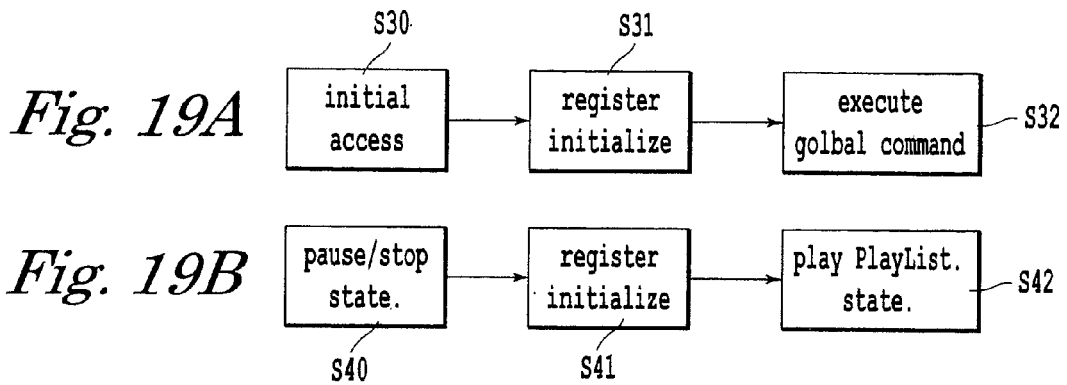
Fig. 19A
Fig. 19B
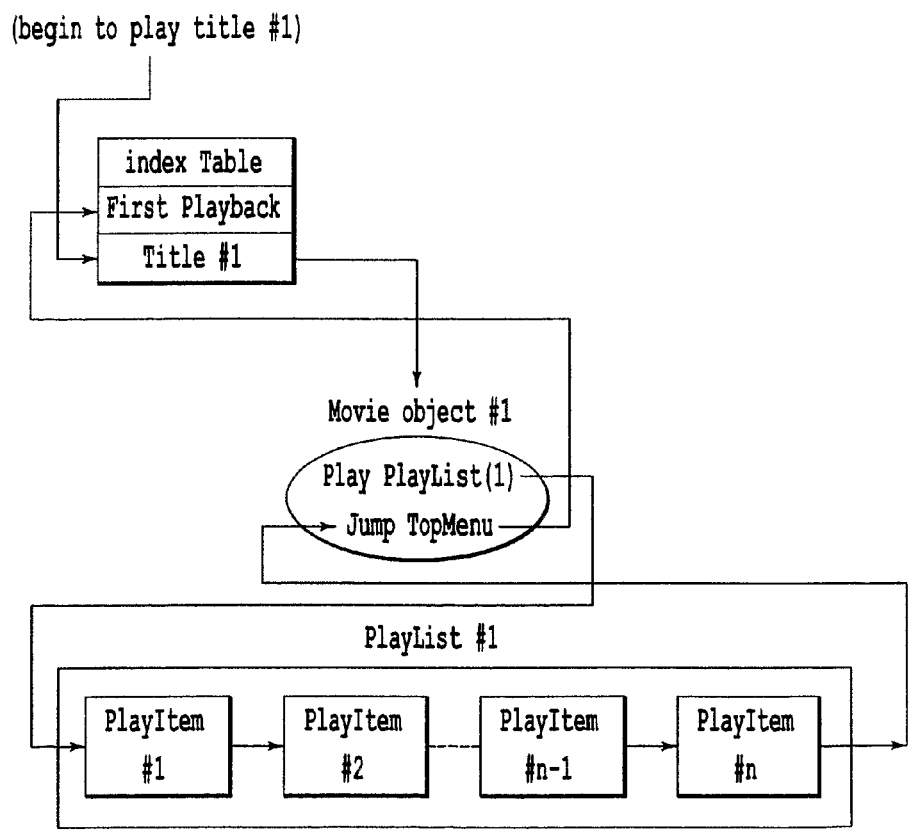
Fig. 20

| Color index value | tree primary colors | | | non-transparent |
|---|---|---|---|---|
| | R | G | B | α |
| 0x00 | 0 | 0 | 0 | 0 |
| 0x01 | 10 | 100 | 30 | 0.5 |
| ⋮ | ⋮ | ⋮ | ⋮ | |
| ⋮ | ⋮ | ⋮ | ⋮ | |
| 0xFF | 200 | 255 | 100 | 0.8 |

REPRODUCING APPARATUS, REPRODUCING METHOD AND REPRODUCING COMPUTER PROGRAM PRODUCT

TECHNICAL FIELD

This invention is related to a reproducing apparatus, a reproducing method and a reproducing computer program product to improve an efficiency of a user interactive operation against to high capacity recording medium, such as BLU-RAY DISC™.

BACKGROUND ART

Recently, the BLU-RAY disc format has been developed as an attachable disc recordable medium format. The BLU-RAY disc format uses a disc recording medium whose diameter is 12 cm, cover layer of 0.1 mm, and blue-violet laser whose wave length is 405 nm. Its capacity is about 25 GB. By using this format, it is possible to record a high definition television signal for more than 2 hours without deteriorating the image.

It is assumed that the source of AV (Audio/Video) signal recorded on this recordable medium can be an analog video signal and a digital television signal. The BLU-RAY format to record these AV signals has been already developed.

On the other hand, a read only medium format, which is a format to define a previously recorded movie or music on a media, is still under development. Although DVD (digital versatile disc) is widely known and popular as a disc to record movies and music, the BLU-RAY disc is superior to DVD in that it is possible to record high definition television signals of more than two hours by its high capacity and high transfer rate.

A "menu" is often recorded with content to control execution of various programs relating to content when selling package medium recorded contents, such as a movie. For example, the menu is displayed by pressing a remote control commander button, and a user selects the menu item using an arrow key. Then play-back device then executes a predetermined process (or operation) corresponding to the menu item selected on the remote commander.

A BLU-RAY read only disc player will display a menu when the user inputs a user operation while playing contents. That is to say, while playing contents, the menu is displayed on top of the playing contents (e.g., movie, video, or image) by the user pressing a predetermined button on the remote commander or play-back unit. A technique to keep playing contents while displaying a menu is disclosed in patent documents JP2005-222683.

As recognized by the present inventors, this reproducing apparatus (or play-back unit) controls the display of the menu and the contents using a same time axis. Therefore, for example, when the user makes the movie temporally stop (i.e., pause), the menu that is displayed on top of the content is also paused and so user operations (menu selections) are neither accepted nor executed.

By way of example, the present inventors recognized the situation where a user can change a spoken language (eg. Japanese and English) and a subtitle (eg. Japanese and English) by using the displayed menu while playing the contents. For example, when a user try to change a spoken language and a subtitle while the content is being played, the user is forced to stop watching the content in order to change the language and subtitle.

On the other hand, after displaying the menu, the user cannot change the spoken language and subtitle because the displayed menu also stops as described above. Therefore after the user changes the spoken language and subtitle while the content is being played, the user needs to reverse the video so as to watch the portion of the content that he was previously watching prior to changing the language and subtitle settings.

DISCLOSURE OF THE INVENTION

One aspect of the invention is to provide a reproducing apparatus, reproducing method and reproducing computer program product that makes it possible for a user to operate a displayed menu regardless if the main content is being actively played or paused.

The present invention is a reproducing apparatus comprising a reference signal unit configured to output a reference signal; an acquiring unit configured to acquire a first stream of data that represents a main image to be reproduced on a display under control of said reference signal, a second stream of data that represents a menu to be displayed with said main image, said second stream being asynchronous with said first stream, and said menu including an item that is user-selectable; and a reproducing control information; an operation receiving unit to receive an operation request when the item in said menu is selected; and a reproducing control unit configured to control reproduction of said main image from said first stream, and menu from said second stream based on said reproducing control information, wherein said reproducing control unit is configured to control the operation receiving unit to execute a computer-implemented operation when the operation request in response to the item in said menu being selected even while reproduction of the main image is paused.

Consequently, a user is able to select displayed menu items using based on a second stream of data while the reproduction of content from a first stream of data is paused.

BRIEF DESCRIPTION OF DRAWINGS

FIG. 7 is a syntax figure showing syntax of MoviePlayList file (PlayList file) "xxxxx.mpls".

FIG. 8 shows an example syntax of PlayList( ) block.

FIGS. 9A and 9B show an example syntax of PlayItem( ) block.

FIGS. 10A, 10B and 10C show an example syntax of a first part of a STN_table( ) block.

FIGS. 11A and 11B show another portion of the example syntax of the STN_table( ) block.

FIG. 12 shows an example of syntax of Stream_entry( ) block.

FIG. 13 shows an example of syntax of SubPath( ) block.

FIGS. 14A and 14B show an example of syntax of SubPlayItem( ) block.

FIGS. 15A and 15B are table of subpath_types defined in SubPath( ) block.

FIGS. 16A-16D show an example recording format of a button image.

FIG. 17 shows an example syntax of an example of ICS.

FIG. 18 shows an example syntax of interactive_composition_data_fragment( ) block.

FIGS. 19A and 19B are flow charts to indicate BD virtual player operation.

FIG. 20 shows a flow chart to indicate BD virtual player operation.

BEST MODES FOR CARRYING OUT THE INVENTION

A brief description of the data structure of the BLU-RAY Read only memory disc recorded on ROM is defined in "BLU-RAY Disc Read-Only format ver1.0 part 3 audio visual specifications". This data structure is discussed below as "BDMV". Furthermore it is possible to record content on a recordable disc, such as BD-R or BD-RE according to this BDMV format.

For example, a bit stream encoded by the encoding method such as MPEG (Moving Pictures Experts Group) video or MPEG audio is called a Clip AV stream (or AV stream). The Clip AV stream is recorded on a disc according to a file system called a "BLU-RAY Disc Read-Only Format part2", or Clip AV stream file.

The Clip AV stream file is a management unit for a file system and is not a management unit for a user to recognize easily. Considering a user's convenience, it is need to record database information on a disc to achieve functions such as, to reproduce content, which are divided into a plurality of Clip AV stream files, to reproduce only a part of a Clip AV stream file or to make a special playback operation in prompt reply to a corresponding user operation. "The BLU-RAY Disc Read-Only format ver1.0 part 3 audio visual specifications", is one of the format books of the BLU-RAY disc family, that provides such database.

Figure 1:
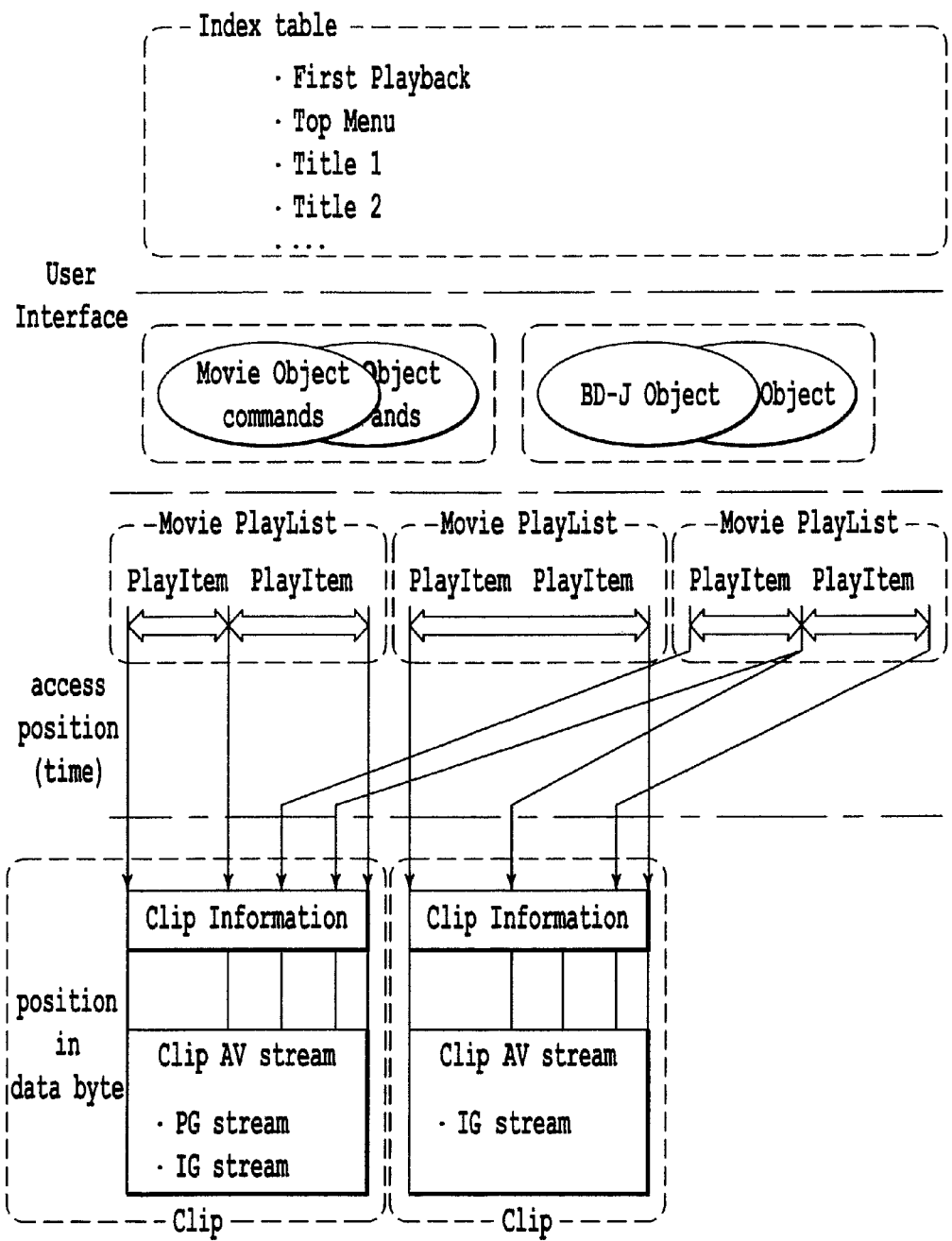
FIG. 1 is a descriptive diagram of an abstract of a BD-ROM data model.

Turning now to the figures, FIG. 1 indicates an abstract of a BLU-RAY ROM data model. The BD-ROM data structure defines 4 layers as shown. The lowest layer is a layer at which a Clip AV stream is disposed (from now on referred to as Clip layer). The layer above the Clip layer is a layer (now referred to as PlayList layer) to dispose a Movie PlayList and a PlayItem to indicate the reproduction position of Clip AV stream. The layer above the PlayList layer is a layer (referred to as an object layer) to dispose items such as a Movie object including a command to designate the reproducing order of a Movie PlayList. And the most upper layer is a layer (referred to as an Index layer) to dispose an index table to manage a title which is recorded on BLU-RAY disc.

The Clip AV stream is a bit stream that has video data and/or audio data multiplexed in MPEG 2 TS (transport stream) form. The information related to this Clip AV stream is recorded as Clip Information.

Furthermore, data streams for subtitles or menu displays that are presented with video data or audio data, can be multiplexed in the Clip AV stream. A stream to present a subtitle is called as Presentation graphic stream. A stream to present a menu is called as Interactive graphic stream. However, they are equally well referred to as a stream.

A Clip AV stream file and clip information may be regarded as one object and called a Clip. That is to say, Clip is an object that includes a Clip AV stream file and a Clip information file.

Files are generally treated as a byte string. Contents in a Clip AV stream are spread over a time axis and an entry point in the clip is designated using a time-based point. When a user provides a time stamp for an access point in a clip, a reproducing apparatus can use a clip information file to know the address information at which the apparatus began to play corresponding to a provided time stamp.

The Movie PlayList has information designating Clip AV stream files to play and has information designating a plurality of start positions (IN time) and end positions (OUT time) to indicate the reproduction positions of the designated AV stream files. One set of these start positions and end positions is called a PlayItem. A Movie PlayList has one or more PlayItems. To play a PlayItem means to play at least part of AV stream file referred by the PlayItem. That is to say, a section in the Clip is played based on the IN time and OUT time information.

A Movie Object includes a HDMV Navigation command program (HDMV program) and terminal information. HDMV program is a command to control reproduction of PlayList. Terminal Information includes permission information to permit or restrict user interactive operation, such as calling menu scene or title search that is restricted based on this terminal information, to the BLU-RAY player.

A BD-J object includes a JAVA program Object.

The Index layer includes an index table. The Index table is a top layer and defines the BD-ROM title. The Module manager included in a BD-ROM stationed system software controls playing the BD-ROM disc based on this title information in the index table.

Figure 2:
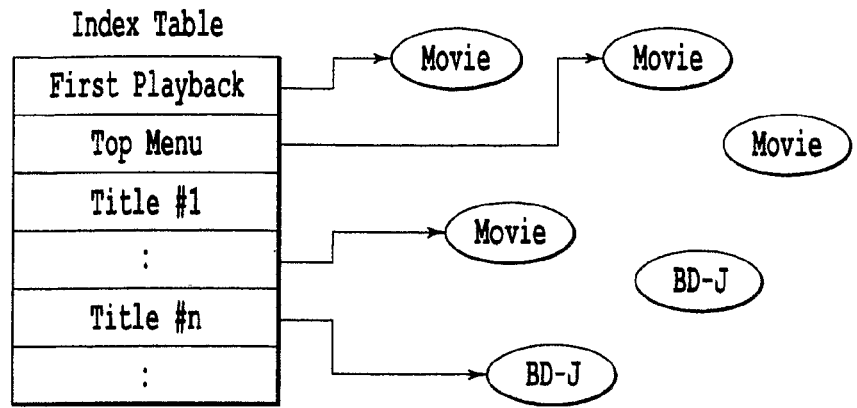
FIG. 2 is a diagram of an abstract of an index table.

That is to say, as shown in FIG. 2 abstractly, an arbitrary entry in the index table is called a title, First playback, Top menu, and title #1, #2 . . . . Registered in the Index table are all titles. Each title has links to Movieobject or BD-J object and indicates whether HDMV title or BD-J title.

For example, First Playback is a commercial image (trailer) played before the substantial movie if the content in the BD-ROM is a movie. The top menu is a menu scene to select playback of a substantial movie, chapter search, subtitle, language or special contents. The Title can be a movie selected from the Top menu in this example and can be a Top menu or a sub menu.

Figure 3:
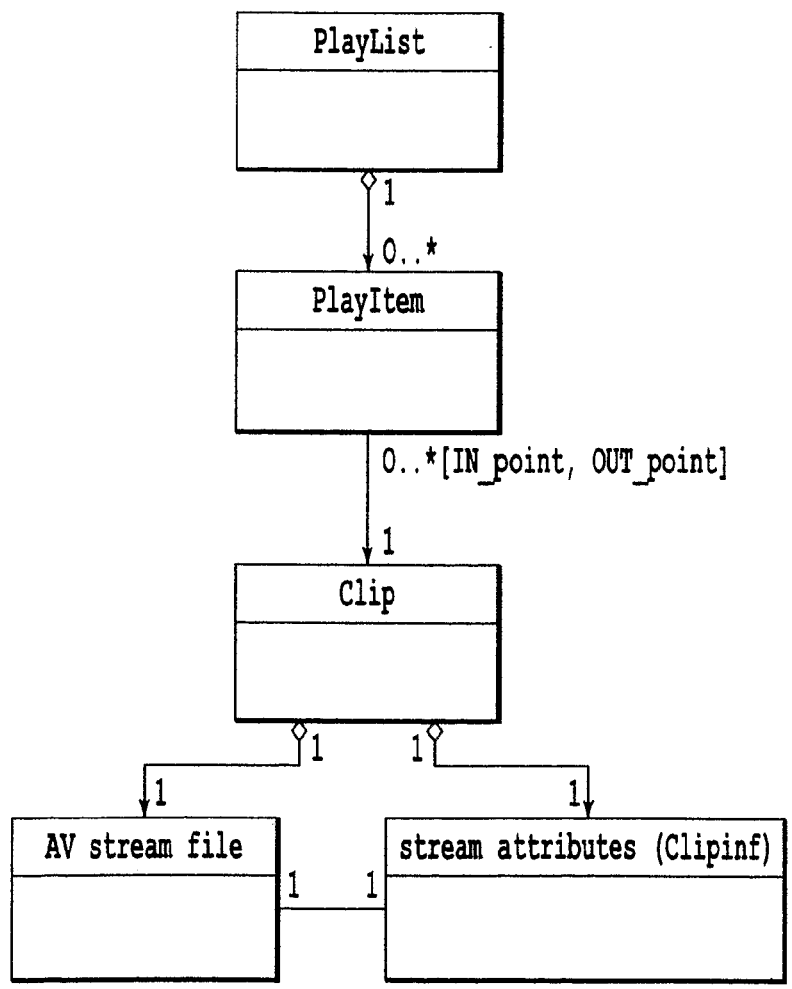
FIG. 3 is a logic diagram showing a relationship between clip information, clip, PlayItem, and PlayList.

FIG. 3 is a UML (Unified Modeling Language) figure showing the relationship between a Clip AV stream, Clip information (stream Attributes), Clip, PlayItem and PlayList. PlayList has a relationship with one or more PlayItems and a PlayItem has a relationship with a Clip. One Clip can have a plurality of relationships with a plurality of PlayItems, which have different IN time and/or OUT time from each other. Also, clip AV stream files and clip information files have one-to-one correspondence. By defining this data structure, the user can designate the playback order of an arbitrary portion of the clip AV stream without destroying and altering the Clip AV stream.

Figure 4:
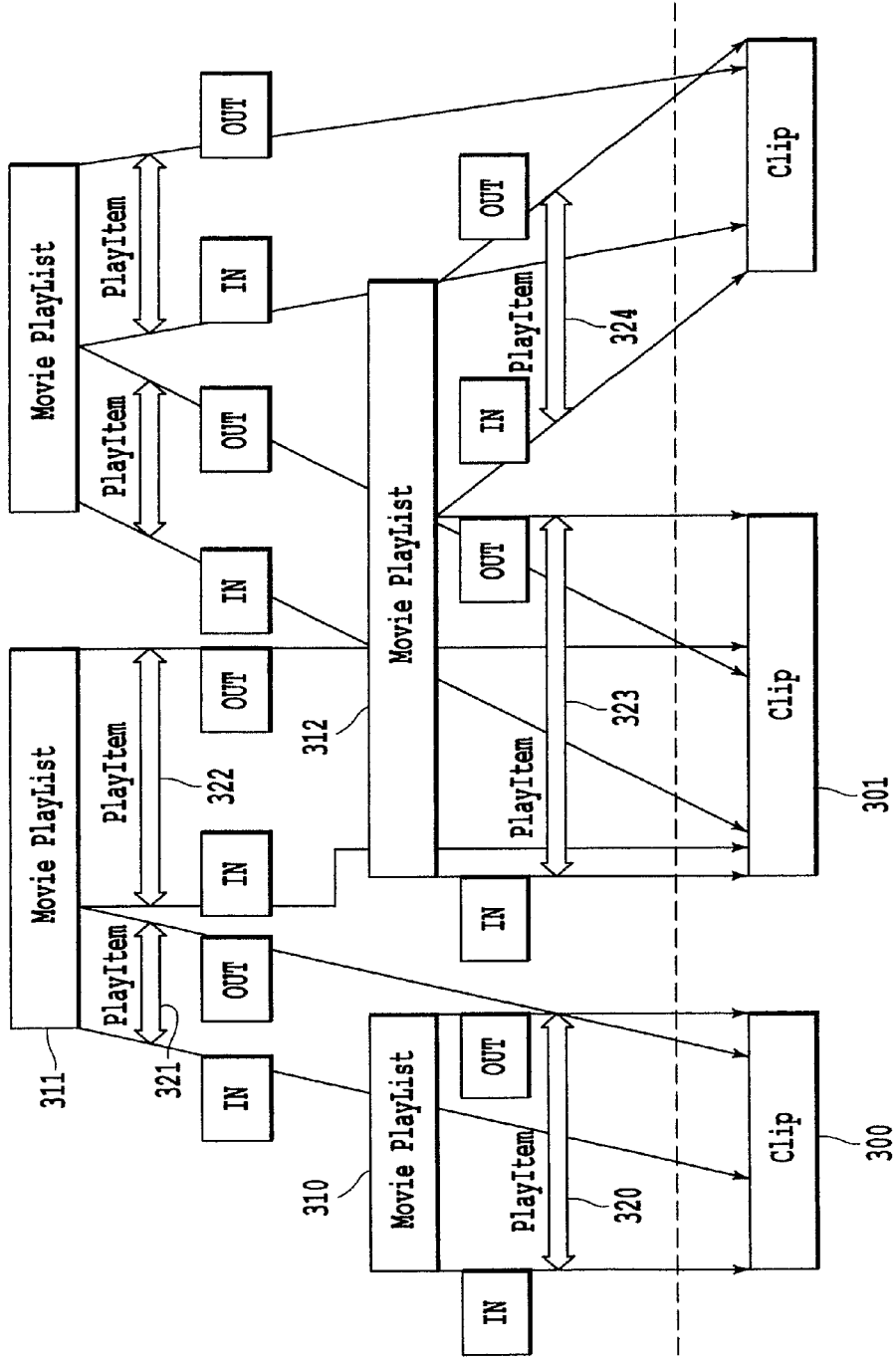
FIG. 4 is a flow diagram showing how one clip relates to a plurality of PlayLists.

As shown in FIG. 4, a plurality of PlayLists can refer to a same clip. Furthermore one PlayList can refer a plurality of Clips. A Clip is referred to by IN time and OUT time in PlayItem included in the PlayList. The example as shown in FIG. 4 indicates that Clip 300 is referred by IN time and OUT time indicated by PlayItem 320 in PlayList 310 and indicated by PlayItem 321 in PlayList 311 which has PlayItem 321 and PlayItem 322. Further a section in Clip 301 is referred by IN time and OUT time indicated by PlayItem 322 in PlayList 311, and another section in Clip 301 is referred by IN time and OUT time indicated by PlayItem 323 in PlayList 312 which has PlayItem 323 and PlayItem 324.

Figure 5:
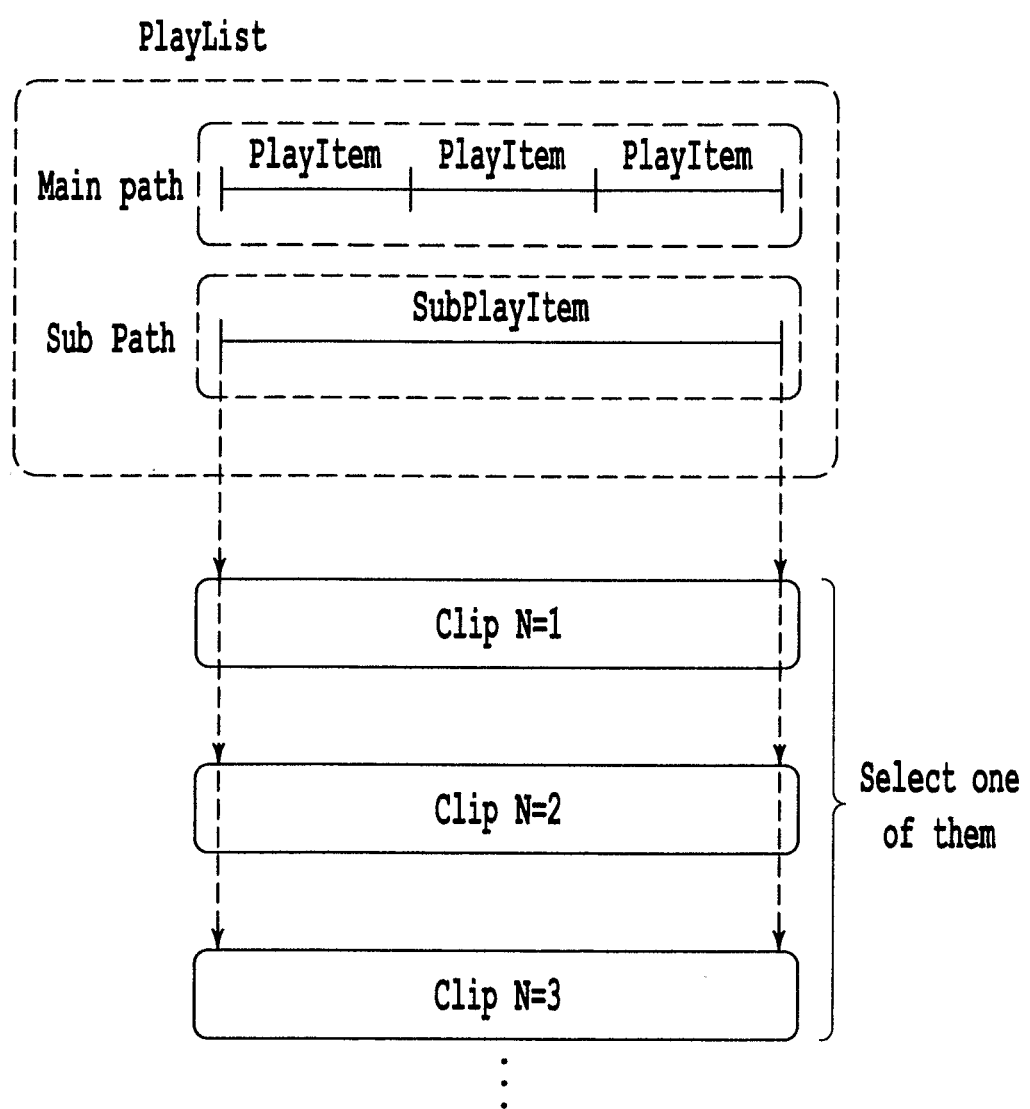
FIG. 5 is a diagram of a Subpath.

Furthermore, PlaytList can have a subpath corresponding to a SubPlayItem regarding to main path corresponding to PlayItem which played as main data, as shown in FIG. 5. SubPlayItem can have a relationship with different several clips, and SubPlayItems can choose selectively one clip among a plurality of clips corresponding to SubPlayItem. A PlayList can have a SubPlayItem under certain conditions.

Figure 6:
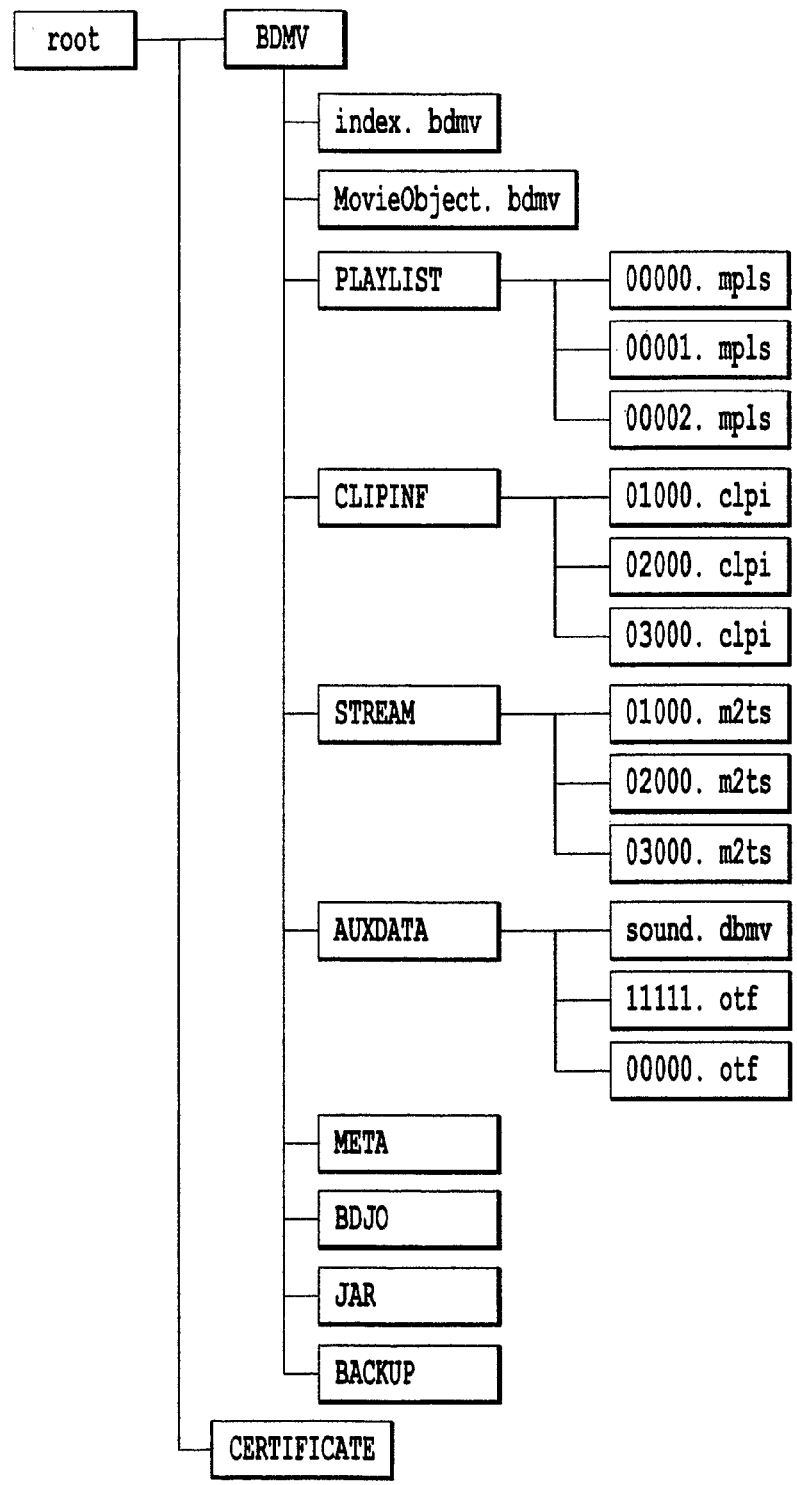
FIG. 6 shows a file management structure recorded on a medium.

Next, we explain file management information defined in "BLU-RAY Disc Read-Only format part 3" using FIG. 6. A file is managed using a hierarchical directory structure. At first one directory (root directory in the example as shown in FIG. 6) is made on a recording medium. A recording and/or reproduction system can managed under this directory.

Under root directory, "BDMV" directory and "CERTIFICATE DIRECTORY" are disposed. "CERTIFICATE DIRECTORY" has information related to copyright information. Under "BDMV" directory, data structure explained using FIG. 1 is recorded.

Right under "BDMV" directory, "index.bdmv" file and "MovieObject.bdmv" file are disposed. Under "BDMV" directory, "PLAYLIST" directory, "CLIPINF" directory, "STREAM" directory, "AUXDATA" directory, "META" directory, "BDJO" directory, "JAR" directory, and "BACKUP" directory are disposed.

"index.bdmv" file describes the contents of BDMV directory. That is to say this "index.bdmv" file corresponds to an index table on an index layer which is a top layer.

"MovieObject.bdmv" file has one or more MovieObject information. That is to say, this "MovieObject.bdmv" file corresponds to the object layer.

"PLAYLIST" directory is a directory in which one or more PlayList files are disposed. That is to say, the "PLAYLIST" directory includes a "xxxxx.mpls" file which is related to the Movie PlayList. "xxxxx.mpls" is a file corresponding to each PlayList.

The "xxxxx" before ".mpls" is a 5 digit number and the "mpls" portion after the period is an extension fixed to this type of file.

"CLIPINF" directory is a directory in which one or more clip information files are disposed. That is to say, a "CLIPINF" directory includes "zzzzz.clpi" files which are clip information files corresponding to each Clip AV stream file. "zzzzz" before "." is a 5 digit number and the "clpi" after the period is an extension fixed to this type of file.

"STREAM" directory is a directory in which substantial AV stream files are disposed. That is to say, "STREAM" directory has Clip AV stream files each of which are corresponding to Clip information file. Clip AV stream file can have transport stream of MPEG 2 (Moving Pictures Experts Group 2) (referred as MPEG2 TS), and the file name is "zzzzz.m2ts". As the "zzzzz" portion before the period is same with the corresponding clip information file, a player can easily know the relationship between clip information file and this Clip AV stream file.

An "AUXDATA" directory is a directory in which a sound file for use in menu displaying, font file, font index file and bit map file. "sound.bdmv" has sound data related to an interactive graphic stream application. The file name is fixed as "sound.bdmv". "aaaaa.otf" file has a font data used in a subtitle or BD-J application.

The "aaaaa" before the period is a 5 digit number and the "otf" portion after the period is an extension fixed to this type of file.

The "META" directory has a Meta data file. The "BDJO" directory and the "JAR" directory contain the file related to a BD-J object. Further "BACKUP" directory has a back up file of one or more files described above.

FIG. 7 indicates the syntax of movie PlayList file "xxxxx.mpls" called from the movie object. "type_indicator" field having 32 bits (4 bytes) data length indicates this file is a moviePlayList file. "version_number" field having 32 bits (4 bytes) data length indicates the version of this movie PlayList. "PlayList_start_address" field having 32 bits (4 bytes) data length indicates a starting address of PlayList block. "PlayListMark_start_address" field having 32 bits (4 bytes) data length indicates the starting address of PlayListMark.

The "ExtensionData_start_address" field having 32 bits (4 bytes) data length indicates the starting address of ExtenstionData( ) block. "ExtensionData_start_address" field indicates the starting address of ExtenstionData( ) as relative bytes numbered from the first byte of "xxxxx.mpls" file. The relative bytes number starts from "0". If this "ExtensionData_start_address" field value is "0", then it indicates that there is no ExtensionData( ) block in this "xxxxx.mpls" file.

In the AppInfoPlayList( ) block, the type of PlayList reproduction restriction is described. In PlayList( ) block, PlayList is described. In PlayListMark( ) block, jump points such as chapter jump points are described. ExtensionData( ) block has a various data to play a content based on this PlayList.

FIG. 8 shows the syntax that indicates the example of PlayList( ) block. The "length" field indicates a data length from just after this "length" field to the end of PlayList( ) and has a 32 bit data length. A region after length field is reserved for future use. In "number_of_subPath" field indicates number of subpath included in this PlayList.

The number of PlayItem( ) blocks in which a PlayItem is included is described based on the number indicated by number_of_PlayItems. SubpathO blocks are described based on SubPath( ) block. The count number based on for loop is a identification of SubPath( ) block, SubPath_id.

Further, Subpath is used for not only audio data as after recording used to record on a recordable disc, but for indicating a sub image which is played synchronously/asynchronously with a clip indicated by a PlayItem when 2 images are compound.

FIGS. 9A and 9B show a syntax to show an example of a structure of PlayItem( ) block. The "length" field have a 16 bits data length indicates a data length from the right after this length filed to the end of this PlayItem( ) block.

The Clip_Information_file_name[0] field having 40 bits (5 bytes) data length indicates the name of clip information file which is referred to by this PlayItem. This PlayItem read out clip information file indicated this Clip_information_file_ name. Clip_codec_identifier[0] indicates the a formula of codec of Clip AV stream which is used by PlayItem in this PlayItem( ) block.

The next 11 bit region is reserved for future use. 1 bit "is_multi_angle_flag" indicates whether this PlayItem is for multi-angle contents or not. Connection_condition having 4 bits data length indicates the connection state between two PlayItem. "PlayItems. Ref_to_STC_id[0]" indicates discontinuity information of STC(System Time Clock) and have 8 bits data length.

IN_time and OUT_time field indicates the playback range of Main clip AV stream and each have 32 bits data length. IN_time field indicates a starting point and OUT_time field indicates an end point.

UO_mask_table( ) is a table in which restriction of receiving user input is set. PlayItem_random_access_flag indicates whether or not a permission to random access within this PlayItem is granted. Next 7 bits data is reserved for future use.

The "still_mode" field indicates whether an image displayed at end of PlayItem in PlayItem( ) block is displayed as a still image or not. If the value of the still mode field is "0x01", then the still time field indicates the "still time". If the value of Still_mode field is other than "0x01", then this 16 bit region is reserved for future use.

If the "is_multi_angle" flag has a value to indicate that this PlayItem is corresponding to the multi-angle ("1"), then the structure to manage the multi-angle is described.

FIGS. 10A, 10B and 10C, and FIGS. 11A and 11B indicate the syntax of a example of STN_table( ). This STN_table( ) defines such as streams played based on this PlayItem and define combination of other streams that can be played back with video stream referred to by the PlayItem composed of Mainpath (Primary video stream).

The streams other than the primary video stream are for example audio streams referred by PlayItem (Primary Audio stream), video stream and audio stream included in a clip corresponding to sub path which is corresponding to main path (secondary video stream and secondary audio stream) and subtitle stream.

More precisely, the STN_table( ) block defines the combination of a secondary audio stream and a primary audio stream, the combination of the secondary video stream and the secondary audio stream, and combination of the secondary video stream and the presentation graphics stream (PG) or text subtitle stream for Picture in Picture (PiP) application.

The "length" field has a 16 bit data length and indicates data length from right after this length field to the end of STN_table( ) block. Next to the length field, is a reserved area (reserved_for_future_use) having 16 bits data and number_of_primary_video_stream_entries having 8 bits are disposed. The number_of_primary_video_stream_entries indicates the number of streams which have primary_video_stream_id and which is registered in STN_table( ) block. The value of primary_video_stream_id is information to identify video streams.

The number_of primary_audio_stream_entries indicates the number of streams which have primary_audio_stream_ids and which are registered in STN_table( ) block. The primary_audio_stream_id is information to identify audio streams.

The number_of_PG_txtST_stream_entries indicates the number of streams which have PG_txtST_stream_id and which iare registered in the STN_table( ) block. In this block, the presentation graphic (PG) stream, which is bit map subtitle encoded by run length code and text subtitle stream (txtST) are registered. The value PG_txtST_stream_id is information to identify these two subtitle stream.

The number_of_IG_stream_entries is registered in STN_table( ) block and indicates the number of IG_stream_entries. In this block Interactive graphics streams are registered.

For example, an interactive graphics menu reproduced by interactive graphics stream displays items such as a button, icon and thumbnail to receive user operation. Interactive graphics menu means two type of displaying method. One is a pop-up menu which turns on or off an interactive graphic stream according to ON/OFF inputted operation by remote commander (or directly on the play-back unit). And the other is always-on, which is displayed all the time.

The "number_of_secondary_audio_stream_entries" field indicates the number of stream which is given secondary_audio_stream_id and which is registered in the STN_table( ) block.

The "number_of_secondary_video_stream_entries" field indicates the number of streams which are given "secondary_video_stream_id" and are registered in STN_table( ) block.

The "number_of_PiP_PG_txtST_stream_entries" field indicates the number of subtitle stream for PiP, which is given secondary Pip_PG_txtST_stream_id and is registered in the STN_table( ) block.

After the 40 bit reserved area, reserved_for_future_use, six "for loop" is disposed. In first for loop, stream_entries( ) block and stream_attribute( ) block are repeated number times indicated by the number_of primary_video_stream_entries using primary_video_stream_id as a variable. This first for loop gives the primary_video_stream_id which increase one by one from value "0" to each video stream specified by stream_entry( ) block. And by the stream_entry ( ) block and stream_attirubute( ) block define each stream attribute, such as which PID (Packet Identification) is allocated to the video stream or else.

In second for loop, stream_entries( ) block and stream_attribute( ) block are repeated a number times indicated by the number_of primary_audio_stream using primary_audio_stream_id as a variable. This second "for loop" gives the primary_audio_stream_id which increases one by one from value "0" to each audio stream specified by stream_entry( ) block.

In third for loop, the stream_entries( ) block and stream_attribute( ) block are repeated a number times indicated by the number_of_PG_txtST_stream using PG_txtST_stream_id as a variable. This third "for loop" gives the PG_txtST_stream_id which increase one by one from value "0" to each Presentation graphics stream or text subtitle stream specified by stream_entry( ) block.

In fourth for loop, the stream_entries( ) block and stream_attribute( ) block are repeated a number times indicated by the number_of_IG_stream using IG_stream_id as a variable. This fourth "for loop" give the IG_stream_id which increase one by one from value "0" to each IG stream specified by stream_entry( ) block.

In fifth for loop, the stream_entries( ) block and stream_attribute( ) block are repeated a number times indicated by the number_of_secondary_audio_stream_stream using secondary_audio_stream_id as a variable. This fifth "for loop" give the secondary_audio_stream_id which increase one by one from value "0" to each secondary audio stream specified by stream_entry( ) block.

In fifth "for loop", not only the stream_entries( ) and stream_attiribute( ) block, but also comb_info_Secondary_audio_Primary_audio( ) are repeated a number times which is indicated by secondary_audio_stream_id. comb_info_Secondary_audio_Primary_audio( ) blocks indicate the combination information of secondary audio and primary audio.

The comb_info_Secondary_audio_Primary_audio( ) block has a number_of_primary_vaudio_ref_entries having 8 bits which indicate the number of primary audio referred by this comb_info_Secondary_vaudio_Primary_audio( ) block.

Next to reserved area (reserved_for_word_ahgn) having an 8 bit data length, "for loop" is disposed and "primary_audio_stream_id_ref" field is repeated a number times which is indicated by "number_of_primary_vaudio_ref_entries". Further if "number_of_primary_vaudio_ref_entries" is an odd number, then another reserved_for_word_align is disposed.

In six "for loop", using value of secondary_video_stream_id as loop variation, stream_entries( ) block and stream_attribute( ) block are repeated a number of times as indicated by number_of_secondary_video_stream_entries, which is described above. In this for loop, secondary_video_stream_id is given to one video stream specified by each stream_entry( ) in order.

In six "for loop", the comb_info_secondary_video_primary_audio( ) block and comb_info_Secondary_video_PiP_PG_textST( ) block are repeated a number times indicated by the number_of_secondary_video_stream_entries using secondary_video_stream_id as a variable.

The Comb_info_Secondary_video_secondary_audio( ) indicates a combination of Secondary video and secondary audio. In comb_info_Secondary_video_Secondary_audio( ), the number_of_secondary_audio_ref_entries field have 8 bits indicating secondary audio stream number referred by this comb_info_secondary_video_secondary_audio( ) block. Further the number_of_primary_vaudio_ref_entries is an odd number, then another reserved_for_word_align is disposed as described in the next for loop.

The Comb_info_Secondary_video_PiP_PG_textST( ) block indicates the combination of secondary video (ex. video for PiP) and PG and/or textST. In comb_info_Secondary_video_Pip_PG_textST( ), the "number_of_secondary_audio_ref_entries" field having 8 bits indicates the number of secondary audio stream number referred by this comb_info_Secondary_video_PiP_PG_textST( ) block. Further the number_of_PiP_PG_textST_ref_entries is an odd number, then another reserved_for_word_align is disposed as described in the next for loop.

By using this STN_table, one can not only define secondary video stream, primary audio stream, secondary audio stream and subtitle stream combined with the primary video stream, but also prevent from the contradictory combination of PG and text subtitle stream for Picture in Picture application.

Further the stream_attribute( ) block in from first "for loop" to six "four loop" indicates the stream attribution of one elementary stream specified by each stream_entry( ) block.

FIG. 12 indicates an example of a syntax of stream_entry ( ). The "length" field having 8 bits indicates data length from right after this length field to end of this stream_entry. Next the "type" field has 8 bits indicating stream type specified by this stream_entry( ) block. This example has three type values "1", "2" and "3". As described I the next "if sentence", the contents in this block can be changed according to the value of type field.

If the value of type field indicates 1, then ref_to_stream_PID_of_mainClip field having 16 bits is described. The ref_to_stream_PID_of_mainClip indicates the Packet ID (PID) to specify one elementary stream from a plurality of elementary stream multiplexed in Main clip referred from PlayItem having stream_entry( ) block.

If the value of the type field indicates "2", then ref_to_SubPath_id having 16 bits length and ref_to_subClip_entry_id having a 8 bit data length and ref_to_stream_PID_of subClip having 16 bits data length are disposed. "ref_to_SubPath_id" field indicates identification information to identify subpath. ref_to_subClip_entry_id indicates referred clip. ref_to_stream_PID_of subClip field indicates PID to specify a elementary stream of clip referred by ref_to_subClip_entry_id used by Subpath. That is to say, if the value of type field indicates "2", then ref_to_stream_PID_of subClip identifies one elementary stream from a plurality of clips which have a plurality of multiplexed elementary stream.

The stream_entry( ) defined in type field "2" is used when a plurality of clips are referred in SubPlayItem( ) and these clips have a plurality of multiplexed elementary streams.

If value of type is "3", then ref_to_SubPath_id having a 8 bit data length and ref_to_stream_PID_of_of_mainClip having a 16 bit data length are described. The ref_to_SubPat_id field indicates identification information to identify subpath. ref_to_stream_PID_of_of_mainClip indicates PID of elementary stream included in main clip and referred by subpath indicated by ref_to_SubPath_id. That is to say if type field indicates "3", then this information specifies one elementary stream referred by subpath from a plurality of elementary streams multiplexed in the main clip when a plurality of elementary streams are multiplexed in the main clip and the main path and subpath refer at least one of elementary streams multiplexed in the main clip.

In stream_entry( ) block when the "type" field indicates "3", ref_to_SubPath_id indicates SubPath_id and this SubPath_id identify Subpath (SubPath( ) block) defined in PlayList( ) as explained using FIG. 8. Further by this Subpath calling SubPlayItem, we can manage IN_Time and Out_time of elementary stream.

Furthermore in the case that "type" field indicates "3", a plurality of elementary streams are multiplexed in a main clip and both main path and subpath refer at least one elementary stream multiplexed in main clip. In the case SubPath_type field indicates "7" as described below.

As described above, by defining type value "1" and "2" in block stream_entry( ) in a block STN_table( ), when a PlayItem and one or more Subpath related to this PlayItem is prepared, we can identify one elementary stream in a clip referred by PlayItem and clips referred by one or more Subpath. That is to say, when type field value indicates "1", stream_entry( ) indicates Clip (main clip) referred by Main Path and when type field value indicates "2", stream_entry( ) indicates clip (Sub clip) referred by sub path.

As described above, by defining type value "1", "2" and "3" in block stream_entry( ) in a block STN_table( ), the player can identify one elementary stream in a clip referred by not only PlayItem but also SubPlayItem, when a PlayItem and one or more Subpath related to this PlayItem are described.

Next, block SubPath( ) in PlayList( ) is explained using FIG. 8 in more detail. FIG. 13 shows syntax describing an example of block SubPath( ). The "length" field having a 32 bits data length indicates data length from right after this length field to end of this block SubPath( ). After reserved_for_future_use having a 8 bit data length, field SubPath_type is disposed. SubPatha_type indicates application type of Subpath defined in block SubPath( ). For example according to value of field SubPath_type, Subpath defined in block Subpath( ) manages Audio, bitmap subtitle or text subtitle. This type of application is described in more detail later.

After reserved_for_future_use, is_repeat_Subpath flag having 1 bit is disposed. This is_repeat_Subpath flag indicates whether play Subpath defined in SubPath( ) block repeatedly while main path is played or play SubPath only once. This is_repeat_SubPath indicates it is used for example in case that playback timing of stream in the clip si referred by main path and stream in clip referred by subpath. One example is that the case main path indicates a slide show which the player plays as a plurality of still pictures while the player changes still pictures seamlessly and sub path indicates back ground music audio of the main path.

Next to "is_repeat flag" and reserved_for_future_use having a 8 bit data length, number_of_SubPlayItems field is disposed. "number_of_SubPlayItems" field indicates number_of_SubPlayItem which a subpath defined in SubPath( ) block owns. SubPlayItem(i) blocks are repeated as many times as indicated by number_of_SubPlayItems as shown in next "for loop".

FIGS. 14A and 14B show an example of syntax of SubPlayItem(i) block structure. The "length" field has a 16 bit data length and right after this length field and SubPlayItem(i) block data length. Next field clip_information_file_name[0] has a 5 byte (40 bits) data length that indicates file name of Clip information file. The value in the last portion parenthesis ([ ]) indicates subclip_entry_id. This is common among similar description below. Clip_codec_identifier[0] having 4 bytes (32 bits) data length indicates system of CODEC of clip.

Next to "reserved_for_future_use" field, "is_multi_clip_entries" field having 1 bit is disposed. This "is_multi_clip_entries" field indicates whether of not this SubPlayItem(i) refers to a plurality of clips. If the value of is_multi_clip_entries is "1" (described as "1b"), then it indicates SubPlayItem refers to a plurality of clips.

The next field is ref_to_STC_id[0] having a 8 bit data length, and indicates information to relating to discontinuity relating system time clock (STC). SubPlayItem_IN_time and SubPlayItem_OUT_time, each of which have 32 bit data lengths, and indicate playback start time and playback end time. That is to say, these SubPlayItem_IN_time and SubPlayItem_OUT_time indicate playback section corresponding to Subpath in a clip.

Next the "sync_PlayItem_id" field having a 16 bit data length indicates PlayItem played synchronously with Subpath defined by SubPlayItem (SubPlayItem(i)). sync_start_PTS_of_PlayItem has a 32 bit data length and indicates a playback start time of subpath on a time axis of main path. These sync_PlayItem_id and sync_start_PTS_of_PlayItem are not used if a start time of a clip AV stream included in Main path and stream indicated by sub path are different.

If a value of is_multi_Clip_entries is "1", then the description above is added further. Reserved area, reserved_for_future_use, having a 8 bit length and num_of_Clip_enries are disposed. Num_of_Clip_entries indicates clip number registered in subPlayItem(i).

As described in the next for loop, clip information is repeated a number times as indicated in num_of_Clip_entries using SubClip_entry_id as a variable. Clip_information_file_name[subClip_entry_id] having a 5 byte (40 bits) data length indicates the file name of clip information file to indicate clip. Clip_codec_identifier[subClip_entry_id] having 4 bytes (32 bits) indicates a system of CODEC of clip. ref_to_STC_id [subClip_entry_id] having a 8 bit data length indicates information relating to discontinuity of system time clock (STC).

This "for loop" starts from the "1" of value of subclip_entry_id. On the other hand, descriptions above this if sentence (if (is_multi_clip_etries==1b)), then such as Clip_information_file_name[0], Clip_codec_identifier[0] and ref_to_STC_id[0] are described as value of subClip_entry_id is "0". Further described above SubPlayItem_IN_time, SubPlayItem_OUT_time, Sync_PlayItem_id and sync_start_PTS_of_PlayItem are used for a plurality of clips referred by description in for loop.

FIGS. 15A and 15B show example of sub path types defined in SubPath( ) block as SubPath_type. This example shown as FIGS. 15A and 15B defines sub path type from value "2" to value "7", and define value "0", "1" and from "8" to "255" as reserved.

"Out-of-mux" as described in FIGS. 15A and 15B means that transport stream including elementary stream referred by sub path is different from transport stream including elementary stream referred by main path. In another words, "Out_of_mux" means elementary stream referred by sub path is not multiplexed with elementary stream referred main path. Hereinafter, this "Out of mux" sub path type is referred to as a path that is non multiplexed with Main path TS.

On the other hand, the "In-mux" as described in FIGS. 15A and 15B means that the transport stream including elementary stream referred by the subpath is the same as the transport stream including elementary stream referred by the main path. In another words, The "In_mux" means the elementary stream referred by the sub path is multiplexed with the elementary stream referred main path. Further, the "In-mux" means a clip of the AV stream of main and clip of the AV stream of sub are included in the transport stream in the main clip. Hereinafter this "In-mux" sub path type is called a path that is multiplexed with Main path TS.

Further if the elementary stream referred by the main path is not played with the elementary stream referred by the sub path asynchronously, then this sub path type is called an asynchronous sub path. On the other hand, if the elementary stream referred by the main path is played with the elementary stream referred by the sub path asynchronously, then this sub path type is called a synchronous sub path.

A SubPath_type="2" value indicates that the sub path is an audio presentation path of a browsable slide show. A browsable slide show means that a still picture's slide show is played with music asynchronously. For example, SubPath_type="2" indicates path of non-multiplexed with Main path TS, and asynchronous path. That is to say, audio presentation path referred by sub path and main path referred by PlayItem are asynchronous.

A SubPath_type="3" value is particularly noteworthy because it indicates that the sub path is a path to display a presentation menu of interactive graphics. For example, SubPath_type="3" indicates that sub path is a path of non-multiplexed with Main path TS and asynchronous path. That is to say, a display of an interactive graphics stream referred by sub path and main path referred by PlayItem are asynchronous.

A SubPath_type="4" value indicates a presentation path of text subtitle stream. For example, SubPath_type="4" indicates that sub path is a path of non-multiplexed with Main path TS and synchronous path.

A SubPath_type="5" value indicates that a sub path is a path of non-multiplexed with Main path TS and synchronous path. Further this Sub path refers at least one elementary stream (Primary Audio stream, PG stream IG stream and secondary audio stream) or Picture in Picture presentation path.

The Picture in Picture presentation path means that a path of at least one of primary audio stream, secondary video stream, secondary audio stream and sub title stream played corresponding to primary video stream which is a video stream referred by the main path.

As discussed in FIGS. 15A and 15B, a SubPath_type="6" value indicates that sub path is a path of non-multiplexed with Main path TS, and is an asynchronous Picture in Picture presentation path which contains one or more elementary stream paths. A SubPath_type="7" value indicates that sub path is a path of multiplexed with Main path TS, synchronous path, Picture in Picture presentation path which contains one or more elementary stream paths.

An interactive graphics stream (IG stream) is now described. The IG stream is a data stream to display a menu of user-selectable items as described above. For example, button images used for the menu display are included in the IG stream. Further the IG stream defines a main path TS non multiplexed type and main path TS multiplexed type. Main path TS non multiplexed type can be a non synchronized path type, which means the sub path is played asynchronously with main path including primary video.

The IG stream is multiplexed in a Clip AV stream, in either the multiplexed with primary video case or not. Interactive graphics stream (see FIG. 16A) has three segments, ICS (Interactive Composition Segment), PDS (Palette Definition Segment) and ODS (Object Definition Segment).

ICS, one of three types of segments, has a basic structure information of IG (which will be described in more detail later). PDS is a segment which has color information of a button image. Further ODS is a segment which has information of a Button shape. ODS has a button image itself such as bitmap data to display button image compressed using run length compression or other compression method.

ICS, PDS and ODS are divided into PES packets, and are held in a payload of a PES packet distinguish by PID as shown example in FIG. 16C. As the PES packet is defined, the maximum size of the PES packet is 64 KB (kilo bytes) and these ICS and ODS can be relatively big in size, ICS and ODS are divided and held in payload of PES packets. On the other hand, because a PDS's size is usually smaller than 64 KB, PDS for 1 IG stream can be held in one PES packet. Identification information in PID of each PES packet indicates which one is held (i.e. ICS, ODS or PDS).

Each PES packet is divided into Transport packets of MPEG TS (Transport Stream) (FIG. 16D). A header of the TS packet have the PID which contains identify data in the TS packet.

FIG. 17 shows an example ICS structure. This ICS has a segment_descriptor( ) block, video_descriptor( ) block, composition_descriptor( ) block, sequence_descriptor( ) block, interactive_composition_data( ) block. The segment_descriptor( ) block indicates this segment is ICS. The video_descriptor( ) block indicates frame rate and image size of video displayed with this ICS. The composition_descriptor( ) block indicates status information of ICS. The sequence_descriptor( ) block indicates whether the ICS is spread among a plurality of PES packets.

In more detail, the sequence_descriptor( ) block indicates whether ICS included in this PES packet is lead ICS or rearmost ICS.

That is to say, when ICS data size is big, ICS is divided into a plurality of PES packets, whose maximum size is fixed at 64 KB. At this time, and in this non-exclusive example, the preceding position of ICS (i.e. shown in FIG. 17 except interactive_composition_data( ) block) may exist only in lead PES packets and rearmost PES packets. And this can be omitted in other PES packets. When the sequence_descriptor( ) block indicates that this ICS is lead ICS and rearmost ICS, the player is able to know ICS is carried in only one PES packet.

FIG. 18 shows an example of a syntax representing structure of interactive_composition_data_fragment( ). FIG. 18 shows interactive_composition_data_fragment( ) as interacitive_composition( ) block. The interacitive_composition_length has a 24 bit data length that indicates the data length of interacitve_composition( ) block from this field. The "stream_model" field has a 1 bit data length that indicates whether this stream is multiplexed with the other stream.

The "stream_model" value "0" indicates that the IG stream is multiplexed and other elementary streams may be multiplexed with interactive graphics stream in the MPEG 2 transport stream. Stream model value "1" indicates that non-multiplexed and only interactive graphics stream exists in the MPEG2 transport stream. That is to say, interactive graphics stream can be multiplexed with AV stream and only interactive graphics stream can be composed of Clip AV stream.

The User_interface_model has a 1 bit data length that indicates whether the menu is displayed by this stream is a pop-up menu or an "always on" menu. A pop up menu is a menu that can be turn on/off by predetermined input means, such as a remote commander's button or a button on player itself. On the other hand, the always on menu is a menu that cannot be turned on/off by a user operation. The user_interface_model value "0" indicates a pop-up menu, and "1" indicates an always on menu. Furthermore, the pop-up menu is permitted only when stream_model value is "1" and interactive graphics stream is not multiplexed with other elementary stream.

If the Stream_model value is "0", then the sentence (after stream_model=='0b', i.e. composition_time_out_pts, and selection_time_out_pts) is valid. The "composition_time_out_pts" field has a 33 bit data length that indicates the time when menu display will be turned off. The "selection_time_out_pts" field has a 33 bit data length that indicates a time when a user operation to operate the menu will not be possible. Time is described by PTS (Presentation Time Stamp) defined by MPEG 2.

A "user_time_out_duration" field has 24 bit data length that indicates automatic initialization time of menu display. A "number_of_page" field has a 8 bit data length that indicates page number of this menu, using initial number "0". That is to say, when this menu has a hierarchy structure and a plurality of pages, then the number_of_page value is bigger than or equal to "1". By repeating the next for loop a number times indicated by number_of_page, each page for menu display is described.

When a disc which has a data structure defined above is loaded, a player needs to translate a command described in such as Movie object read from disc to an intrinsic command for the player. The player has software to make such translation in read only memory (ROM) installed in the player. This software is called as BD virtual player because it makes a player act according to BD ROM standard by mediating between disc and player.

FIGS. 19A and 19B show a BD virtual player from a functional view. FIG. 19A shows the player action when a disc is loaded. When disc is loaded in a player and the player make an initial access (Step S30), a register is initialized to memorize one or more common parameters used for one disc (Step S31). Next in Step S32, the program is loaded from disc and executed. "Initial access" means that the disc is played the first time, such as when the disc is inserted.

FIG. 19B shows an example of a player action when the playback user operation is executed at the time the player does not play. On first pause state (Step S40), playback user operation is made by remote commander (UO: User Operation). When the playback user operation is made, at first common parameters in registers are initialized (Step S41). Next step S42, playback phase of Movie Object is made.

FIG. 20 shows playback of the PlayList in a playback phase of a Movie Object. Now explained is the case when instruction to play content of title #1 is made by a User Operation. The player refers to an index table as shown in FIG. 2, and gets an object number corresponding to contents of title #1 in response to an instruction to play contents. For example, if object #1 is a number corresponding to title #1, then the player executes Movie Object #1.

An example as shown in FIG. 20, has a program written in movie object #1 composed of 2 sentences. The player.plays PlayList#1 based on first sentence, "Play PlayList(1)". PlayList #1 has one or more PlayItems that are played in order. When playback of all PlayItems in PlayList#1 is accomplished, the player executes Movie object 1 again and second sentence is executed. The second sentence is "jump TopMenu" in the non-limiting example of FIG. 20, so this command is executed, then Top Menu is played as described in the second sentence of the Movie Object.

Figure 21:
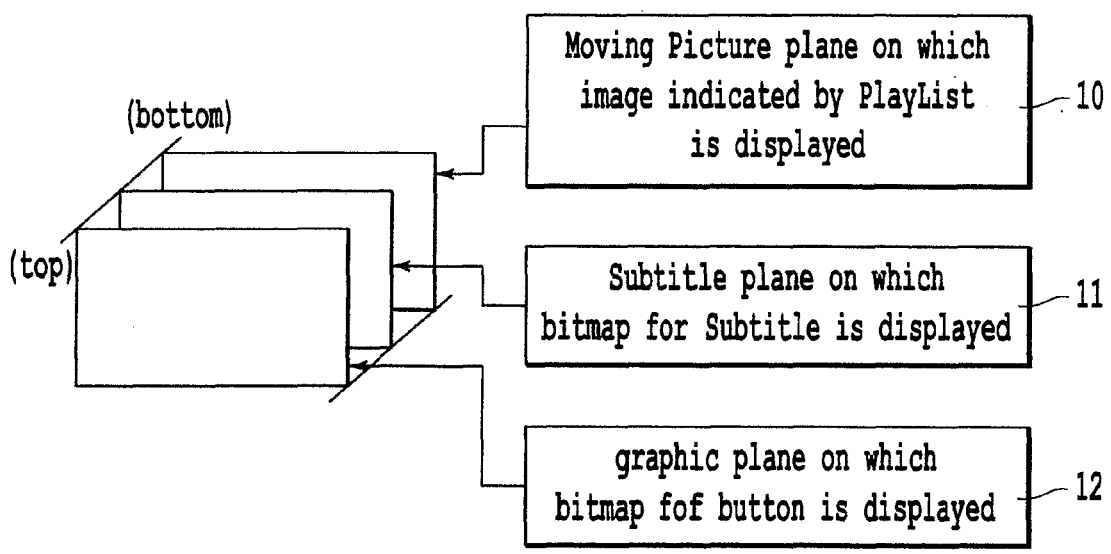
FIG. 21 shows an example of plane structure used as display system of image.

Now is explained the display image that is performed according to one embodiment. This embodiment uses a plane structure as shown in FIG. 21. Moving picture (video) plane 10 is displayed at a rearmost plane and image data (mainly video data) is displayed. Subtitle Plane 11 is on the Moving picture (video) plane 10 and Subtitle data is displayed. Interactive graphics plane 12 is a front plane and character data to display the menu and bitmap data of button data image is displayed. One display has these three planes.

Now the graphics plane 12 is described as an interactive graphics plane 12.

Moving picture plane 10, subtitle plane 11, interactive graphics plane 12 can be displayed independently. Moving picture plane 10 has 1920 pixel×1080 lines, and a data length per one pixel is 16 bits and has a system which is 4 (Luminance Y), 2 (color difference signal Cb), 2 (color difference signal Cr) (from now referred to as YCbCr(4:2:2)). YCbCr(4: 2:2) is a color system with luminance signal Y, Cb and Cr having 8 bits per one pixel. Interactive graphics plane 12 and subtitle plane 11 are planes with 1920 pixel×1080 lines and each pixel having 8 bits, and the color system is 8 bits color map address using 256 colors.

Interactive graphics plane 12 and subtitle plane 11 have 256 level alpha blending. When mixing with another plane, non transparency can be set at a 256 level. It is possible to set non transparency to each pixel. From now on, non transparency α is represented by the range (0≦α≦1). α=0 means totally transparency and α=1 means totally non transparency.

On Subtitle plane 11 and interactive plane 12, PNG (portable network graphics) images or JPEG image, image encoded using run length compression, or bitmap image data can be displayed. PNG format can handle non transparency information (also called as alpha(α) data). Alpha blending is processed based on this non transparency information. Palette data up to 256 colors can be used and color factors (indexes) of each pixel are expressed by index table.

Figure 22:
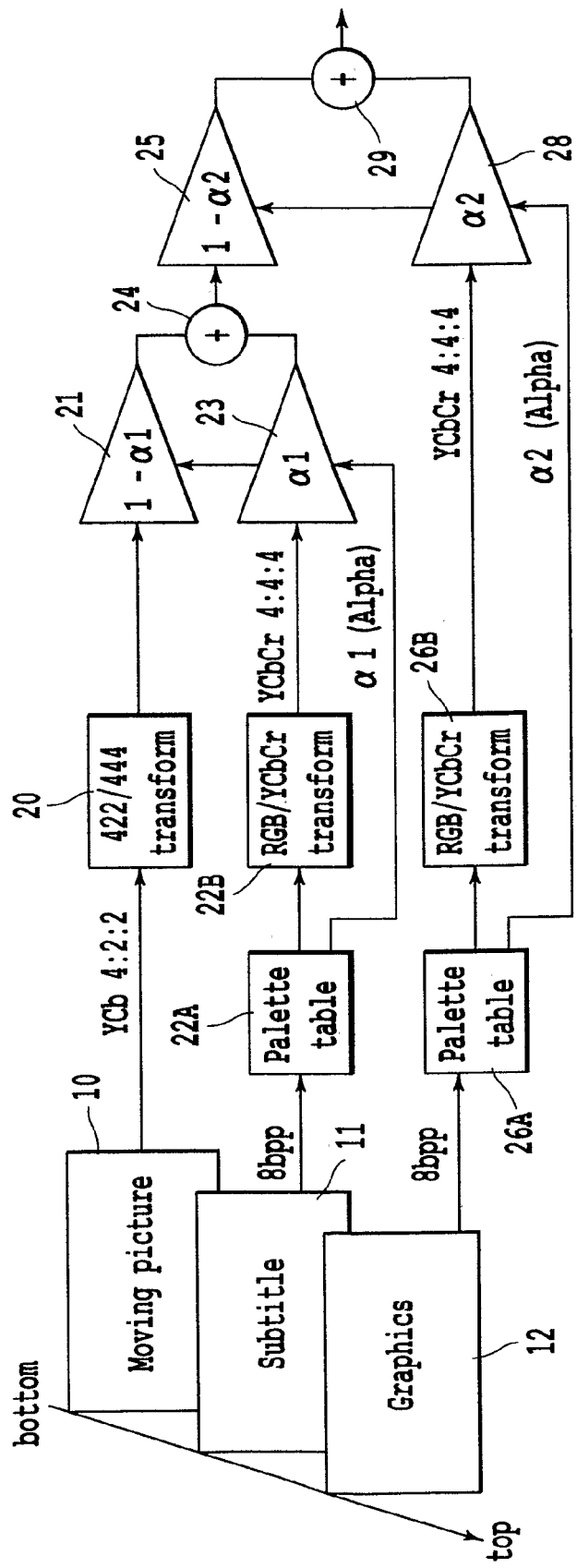
FIG. 22 is a block diagram indicating how to mix moving picture plane, subtitle plane and graphics plane.

FIG. 22 shows a graphics process for how to mix three planes according to FIG. 21. The structure as shown in FIG. 22 can be achieved by any combination of hardware and software. Video image data on Moving picture plane 10 is supplied to 422/444 transform circuit 20. Color system of video image data is transformed from YCbCr(4:2:2) to YCbCr(4:4:4) by 422/444 circuit 20 and inputted to alpha blending circuit 21.

Image data of subtitle plane 11 is input into palette 22A and out put image data as RGB(4:4:4). When non transparency is set to this image data, set non transparency α1 (0≦α1≦1) is outputted from palette 22A. In Palette 22A, palette information is memorized corresponding to the PNG format and index number is referred using inputted 8 bit data as an address. Based on this index number, RGB(4:4:4) data having 8 bits data is outputted based on this index number.

Figures 23, 24:
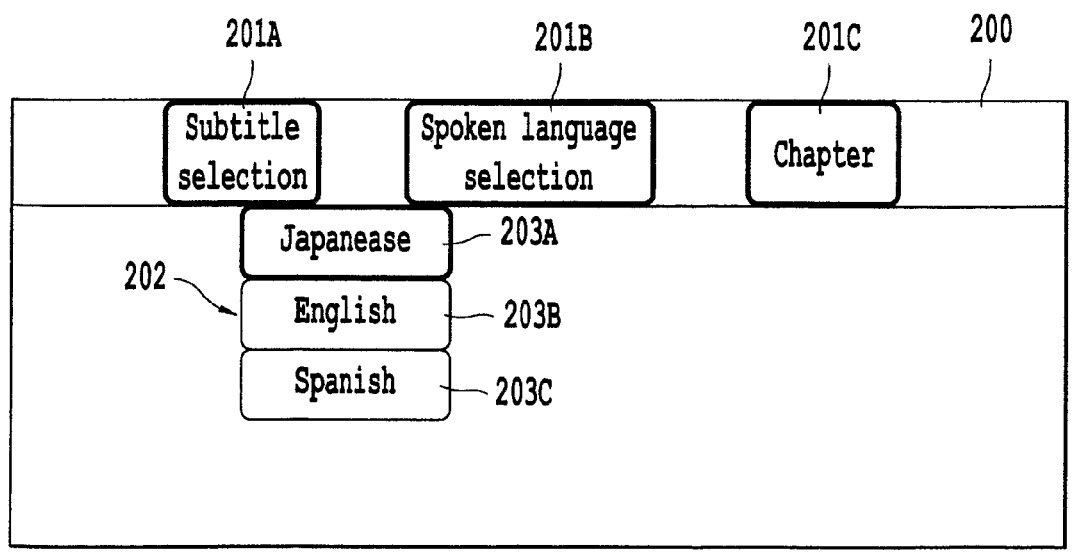
FIG. 23 is an exemplary palette table.
FIG. 24 shows user interface illustrating how a displaying menu based on IG stream and video stream based on PlayList of Main path are combined.

FIG. 23 shows an example of palette table memorized in palette 22A. Three primary colors R, G and B and non transparency α, each having 8 bits are allocated to each 256 color index number value [0x00]–[0xFF] (0x means hexadecimal). Based on inputted PNG image data, player refer palette table in Palette 22A. Palette 22A output R, G, B and non transparency α, corresponding to index value.

RGB data outputted from palette 22A is supplied to RGB/YCbCr transformation circuit 22B, and is transformed into luminance signal Y, color difference signal Cb and Cr (from now we call YCbCr data.). This is for treating a common data structure in a mixing plane after this process, therefore standardizing in a YCbCr data structure, which is moving picture data structure.

YCbCr data outputted from RGB/YCbCr transform circuit 22B and non transparency α is inputted into alpha blending circuit 23. In alpha blending circuit 23, inputted YCbCr data is multiplied by non transparency α1. The result of the multiplication is inputted into one terminal of adder 24. Furthermore each luminance signal Y, color difference signal Cb, Cr is multiplied by α1 in alpha blending circuit 23. The logical complement of α1, (1−α1), is supplied into alpha blending circuit 21.

In Alpha blending circuit 21, video data inputted from 422/444 transformation circuit 20 is multiplied by the logical complement of α1 (1−α1). The product is inputted into the other terminal of adder 24. By doing this, moving picture plane 10 and subtitle plane 11 are mixed. The sum is inputted into the alpha blending circuit 25.

Image data of interactive graphics plane 12 is inputted into palette 26A and outputted as RGB(4:4:4) data. When non transparency is set to this image data, set non transparency α2 (0≦α2≦1) is outputted from palette 26A. RGB data outputted from Palette 26A is transformed into YCbCr data by RGB/YCbCr transform circuit 26B and standardized into YCbCr data format, which is the same with moving picture format. YcbCr data outputted from RGB/YCbCr transformation circuit is inputted into the alpha blending circuit 28.

When Image data used on interactive graphics plane 12 is PNG format, then non transparency data α2 can be set to each pixel in image data. Non transparency data α2 is inputted into the alpha blending circuit 28. In the alpha blending circuit 28, each luminance signal Y, color difference signal Cb and Cr of YCbCr data inputted from RGB/YCbCr transformation circuit are multiplied by α2. The product is inputted into one terminal of adder 29. Furthermore the logical complement of non transparency data α2 (1−α2) is inputted into alpha blending circuit 25.

In alpha blending circuit 25, the sum from the adder 24 is multiplied by the complement of non transparency data α2 (1−α2). The result of the alpha blending circuit 25 is inputted into another terminal of adder 29 and is added to the result of alpha blending circuit 28.

For example, if non transparency α a of a region which does not have an image to be displayed is set to α=0 on subtitle plane or graphics plane, then the plane under the plane can be shown. By doing this, video image data on moving picture plane 10 can be shown as a background image.

Next we will explain one exemplary embodiment to accomplish the pausing of a video display, while maintaing the interactivity with user-selectable items from the menu. This embodiment uses another clock to manage the IG stream to show the pop up menu which is not synchronous with the main path for video. By doing this, even when video stream being played based on the main path described in the PlayList is paused, a user operation relating to execution of operations associated with items selected from a pop up menu can be accepted abnd performed.

Figure 25:
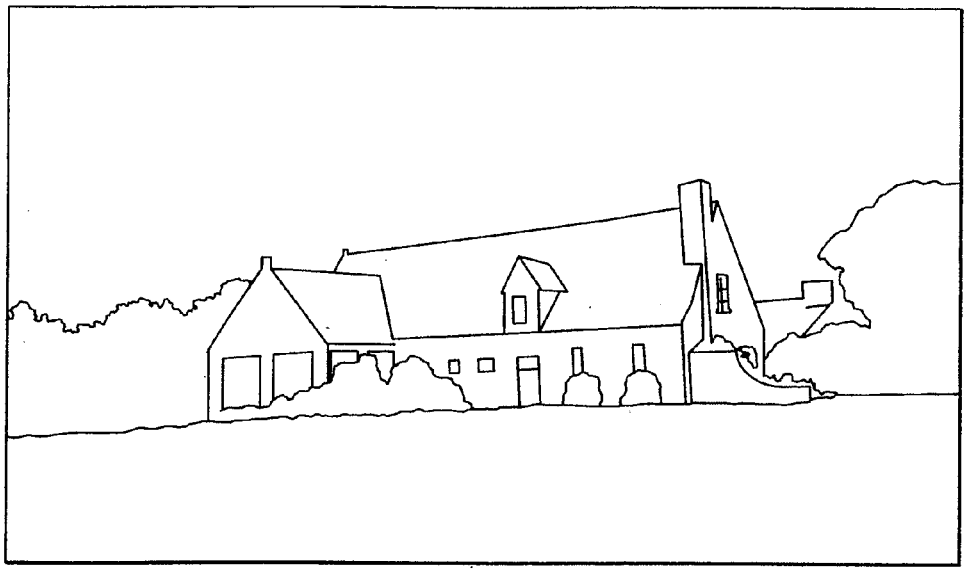
FIG. 25 shows example displayed image showing how to mix displaying menu based on IG stream and video stream based on PlayList of Main path.
Figure 26:
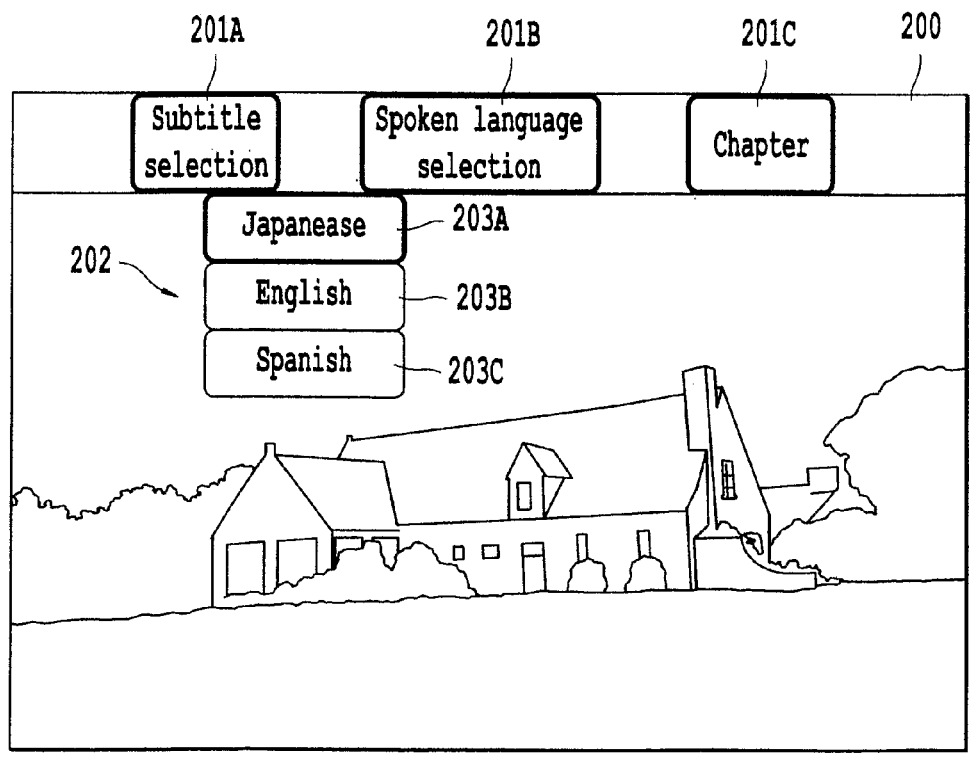
FIG. 26 shows example displayed menu based on IG stream and video stream based on PlayList of Main path.

What follows is an explanation of an example of mixing a menu display by IG stream with a video stream played based on main path described in PlayList using FIGS. 24, 25 and 26.

FIG. 24 shows a graphical user interface as an example of a menu display created by the IG stream. In this example, the background image 200, button 201A, button 201B and button 201C are displayed by the IG stream. When right or left user operation by remote commander is made, these buttons 201A, 201B and 201C are to be selected state corresponding to the operation. Furthermore when one button is in selected state so that a determination is made of a user-selected operation, the function or operation associated with that button is executed by the player.

An explanation is now given of a mix of video data on moving picture plane 10 with this menu display using FIG. 25. Non transparency a of portion except menu display including pull down menu 202 in FIG. 24 is set to α=0, and interactive graphics plane 12 is mixed with moving picture plane 10. By doing this, the player can display as shown in FIG. 26 mixing video data as shown in FIG. 25 with menu display shown in FIG. 24.

Video data displayed on moving picture plane 10 is based on the PlayItem of the main path being processed based on a STC (system time clock). On the other hand, the menu display on the graphics plane 12 is based on a non-synchronous sub path that is processed based on different clock from a clock of video data, a so called "free run clock". By doing this, when the video image is based on the main path and the menu is displayed in one display, user operation determination, such as selection of a button, turn on/off menu display can be achieved even when video data is paused. In another words, it is easy and reasonable to use same STC clock to display the menu as STC is a clock to make standard clock signal. But this embodiment uses two clocks, one is to manage video and another is to manage the IG stream.

Figure 27:
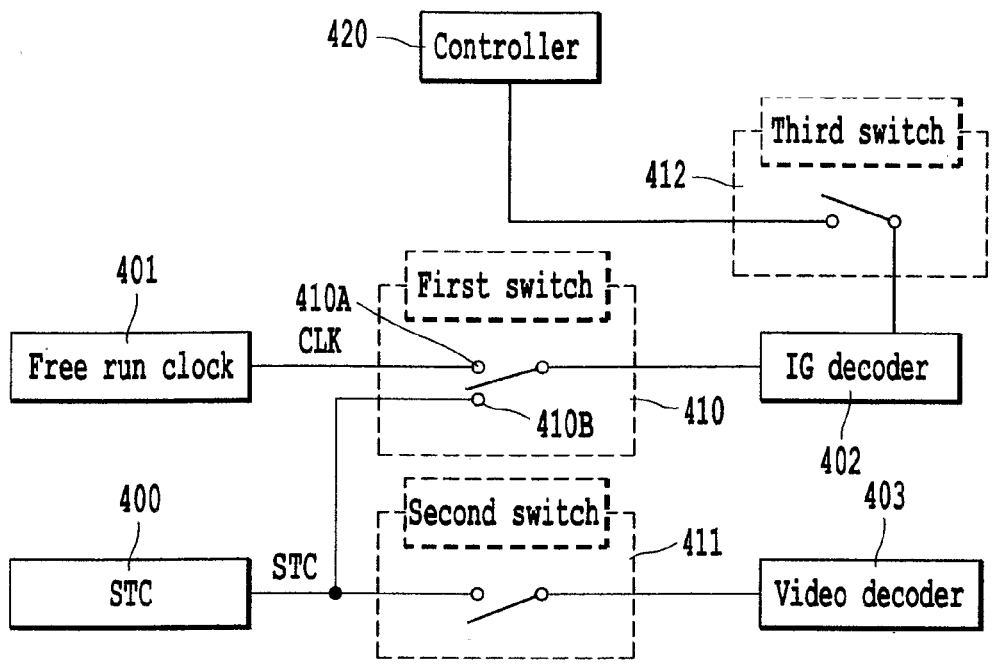
FIG. 27 is a block diagram of a hardware, firmware, or software-based circuit structure use to control a first image and a second data image, such as a menu with selectable items.

FIG. 27 shows an example of structure to control a display. The STC portion 400 creates the STC. The STC created by the STC portion 400 is supplied to one terminal 410B of a first switch portion 400 and is supplied to an IG decoder 402 based on selection of switch portion 400. Furthermore STC is supplied to second switch 411 and is supplied based on selection of second switch 411. The free run clock portion 401 creates clock CLK with an arbitrary frequency. Clock CLK is supplied to one terminal 410A of first switch 410 and is supplied to IG decoder 402 based on the selection of switch 410.

IG decoder 402 decodes the IG stream based on the supplied clock CLK or STC and makes the IG stream available to interactive graphics plane 12. In the same way, video decoder 403 decode the video stream of the main path based on the STC and makes the video stream in a state that is able to be supplied to moving picture plane 10.

The controller 420 process corresponds to the operation based on an operation portion such as remote control commander. For example controller 420 controls switch portion 410, switch portion 411 and switch portion 412 corresponding to operation. Furthermore controller 420 supply a control signal to control IG decoder 402 to IG decoder 402 via third switch 403. By changing switch portion 4120N/OFF, ON/OFF of the output from IG decoder 402 can be controlled. Furthermore the first switch is used to be supplied from the IG decoder. But needless to say, if the player uses only non synchronous type, then switch 410 is not necessary as the non synchronous IG can be played only based on the free run clock.

Figure 28:
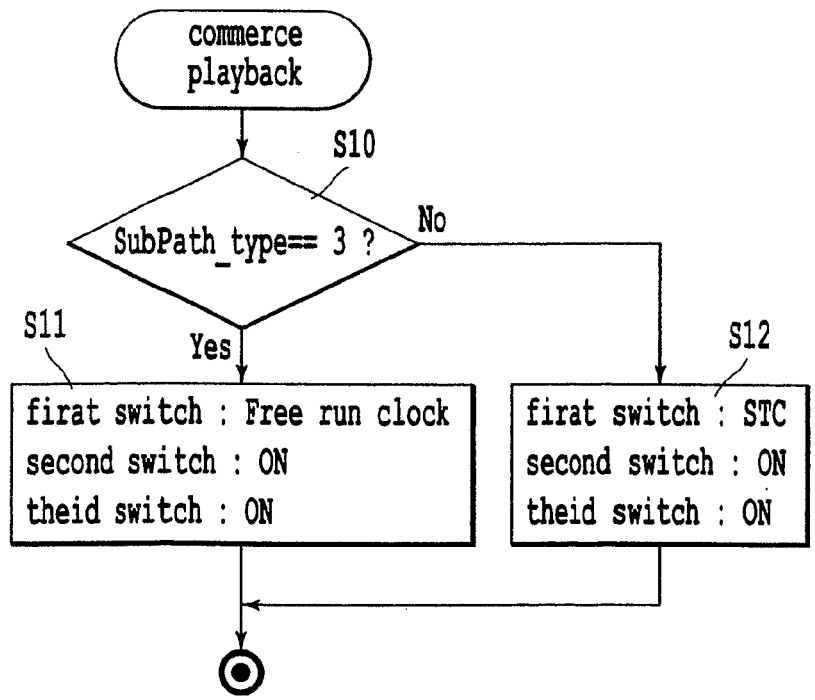
FIG. 28 is a flow chart of how to control displaying.
Figure 29:
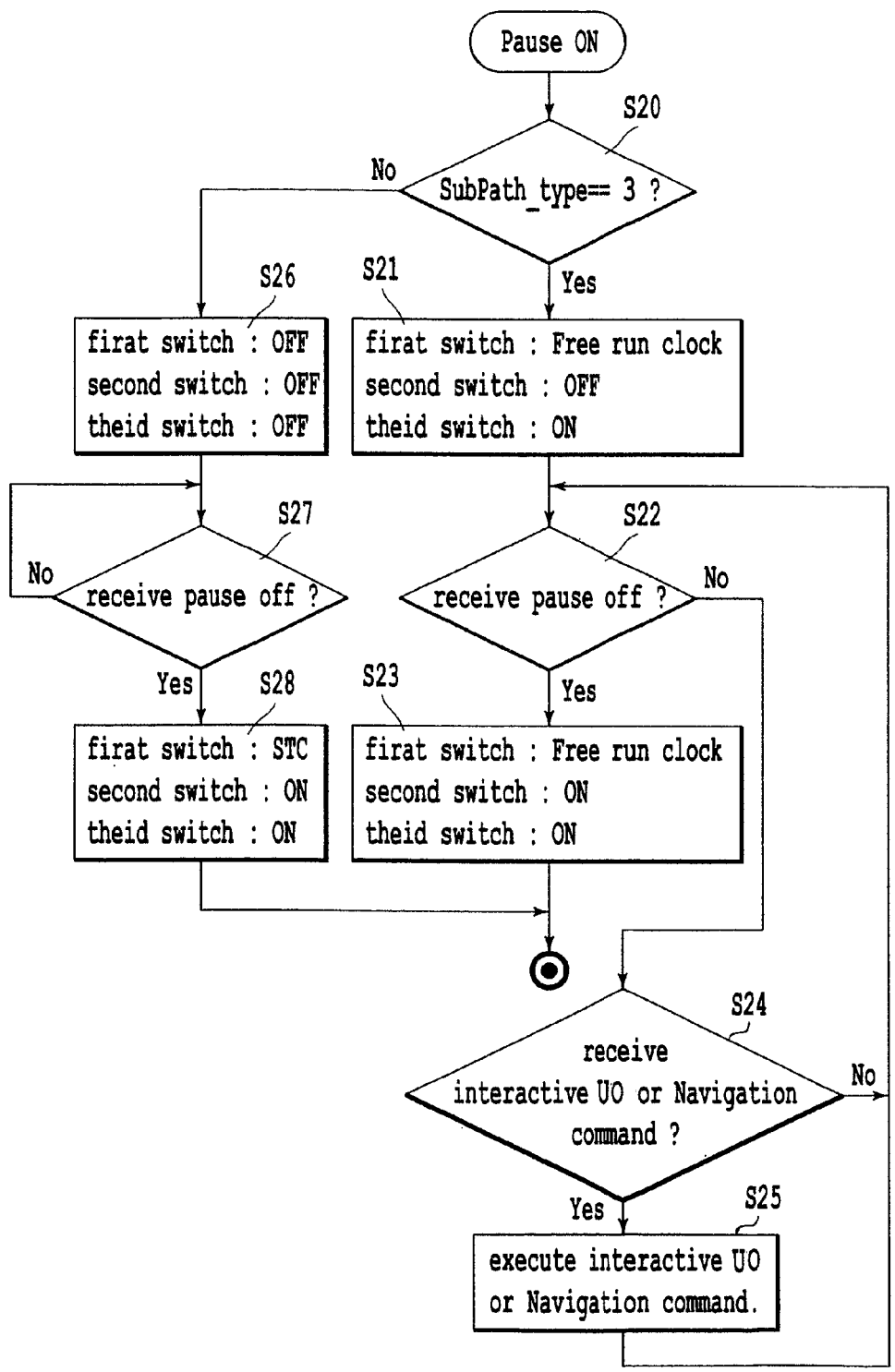
FIG. 29 is another flow chart of how to control displaying.

Now a method is explained for how to display both menu and video by way of a flow chart shown in FIG. 28 and FIG. 29. In FIG. 28, when video stream based on main path of PlayList is begun, then at first subpath type is checked referred from the PlayList in Step S10. That is to say, SubPath( ) block in PlayList( ) block in PlayList is checked in Step S10. It is checked whether SubPah_type in SubPath( ) block is equal to "3" and this sub path is a subpath to display presentation menu of interactive graphics.

In more detail, in Step S10, PlayItem( ) block in PlayList ( ) block is referred and STN table( ) block in this PlayItem ( ) block is referred (FIGS. 9A and 9B). Furthermore stream_entry( ) block in STN_table( ) block of IG stream is searched and type field value is obtained from the stream_entry( ) block. When type value is "1" or "3", then it means that clip of main path is referred, so the player can know that the SubPath_type field value is not "3".

Furthermore the selection of the IG stream is made by the controller to control inputted operation corresponding to user operation by the remote commander. For example, the controller to control inputted operation generates IG_stream_id to identify IG stream corresponding to user operation and sends IG_stream_id to controller which interprets the syntax of PlayList. This controller refer STN_table( ) block is based on sent IG_stream_id and search corresponding stream_entry( ). Furthermore, IG_stream_id is set "0" as default value.

Type field value is "2", then ref_to_SubPath_id in stream_entry( ) block is obtained, and SubPath( ) block in PlayList( ) block corresponding to ref_to_SubPath is referred and Subpath_type value in Subpath( ) block is obtained.

If SubPath_type value is determined that is equal to "3" in Step S10, then processing based on Step S11 is made. In Step S11, input terminal 410A of first switch 410 is selected. Free run clock CLK is supplied to IG decoder 402 and third switch 412 is made ON state. Furthermore, Second switch 411 is made ON state and STC is supplied to video decoder 403. By doing this, output from IG decoder 402 and video decoder 403 is controlled non-synchronously.

On the other hand, if SubPath_type value is determined not to be equal to "3" in Step S10, then processing based on S12 is made. In Step S12, input terminal 410B of first switch 410 is selected. Second switch 411 is made ON state and STC is supplied to video decoder 403 and IG decoder 402. By doing this, output from IG decoder 402 and video decoder 403 is controlled synchronously.

FIG. 29 shows an example of processing in the case that playing video is paused by user operation, while playing video stream based on PlayList of main path. For example, a first instruction is made by user input to pause (stop playing content temporarily) by user operation using an operation unit. This instruction is passed to controller 420. Corresponding to this instruction, controller 420 checks SubPath_type( ) referred by this PlayList and determines whether the value of SubPath_type( ) is equal to "3" or not (Step S20). Because the process of Step S20 is the same with the process of Step S10 in FIG. 28, a detailed explanation is omitted.

When the player determines that SubPath_type value is equal to "3", then process of Step S11 is made. In Step S21, input terminal 410A in first switch 410 is selected. Free run clock CLK is supplied to the IG decoder 402 and the third switch 412 is turned on. the Second switch 411 is also turned off.

By doing this, playing the video stream based on the PlayItem of main path is paused as second switch 411 turned off. And output and decode of IG stream on IG decoder 402 as free run clock is supplied to IG decoder 402.

Next step S22, the controller determines whether an instruction by user operation to change the pause state, such as by selecting the play command, is made or not. If changing the pause state is made, then process of Step S23 is made and goes back to S11 in FIG. 28. That is to say, input terminal 410A is selected and free run clock is provided to IG decoder

402 and third switch 412 is turned on. Second switch 411 is turned on and the STC is supplied to video decoder 403.

On the other hand, in S22 if releasing the pause state is not made, then process of Step S24 is made, and controller determines whether interactive user operation (UO) nor Navigation command is received or not in Step S24. In the case that neither interactive UO and navigation commands are not received, then the flow goes back to S22.

In Step S24, in the case that interactive UO or navigation command are received, then process goes to Step S25 and received interactive UO or navigation command is executed.

Interactive UO is an instruction made by user operation using remote control commander based on displayed menu by IG stream. For example, corresponding to an operation of an operation unit, an instruction to select a button, instruction to determination or turning ON/OFF pop up menu as instruction of interactive UO is sent from operation unit.

Furthermore, navigation command is a command to control playback based on PlayList on object layer or PlayList layer. Navigation command is, for example, commands for selection of stream, change of spoken language or subtitle, change of angle, change of Picture in picture. Navigation command is sent corresponding to interactive UO.

In FIG. 26, interactive UOs are shown for operation to display menu, to select button 201A, 201B or 201C, to display pull down menu 202 corresponding to selected button and to select and determine button 203A, 203B or 203C. Furthermore navigation command allocated to button 203B is sent when button 203B is determined by interactive UO. Such determination whether or not interactive UO or navigation command are received, and process is made when received these interactive UO or navigation command in Step S24 and Step S25.

Furthermore if the navigation command received in Step S24 is one of the commands to change stream positions, such as chapter jump or change playback title, then release of pause (e.g., resume playing) is executed without instruction to release of pause. On the other hand, if navigation command is one of commands to change the spoken language or subtitle format, change of angle and change of picture in picture, then pause state is kept as these command do not change the stream position.

In Step S20, if SubPath_type is not equal to "3", then process goes to S26. In S26, all switch portions (switch portion 410, switch portion 411 and switch portion 412) are turned off. By doing this, playback of video stream based on PlayItem of main path is paused temporarily and stop decoding IG stream and menu display is off state.

And when an instruction to release the pause state (Step S27) is sent, then, process flow goes to Step S28 and state of switch goes to a state in S12 as described. That is to say, input terminal 410B of first switch 410 is selected. Second switch 411 is made to the ON state and STC is supplied to video decoder 403 and IG decoder 402. By doing this, output from IG decoder 402 and video decoder 403 is controlled synchronously.

As described above, using independent free run clock to STC, and in the case the sub path to play IG stream is non synchronous with the main path and is a subpath to refer stream which is not multiplexed in transport stream referred by PlayItem of main path, the IG decoder 402 to decode the IG stream is operated based on the free run clock CLK. By doing this, even when user pause playback of video stream of main path played based on STC, player can decode IG stream a user can executeoperations displayed by the menu by IG stream.

Furthermore, although it was explained that the controller determines that the IG stream is non synchronous type or not based on SubPath_type by analyzing PlayList of main path, this is not to be construed as a sole embodiment for carrying out this funtion. For example, it is possible for a controller to determine this based on the stream itself. For example, if only one subpath is defined corresponding to the main path and the stream corresponding to this Sub path is an IG stream, then the controller can determine that the player can play stream corresponding to the sub path as a non synchronous type.

Figure 30:
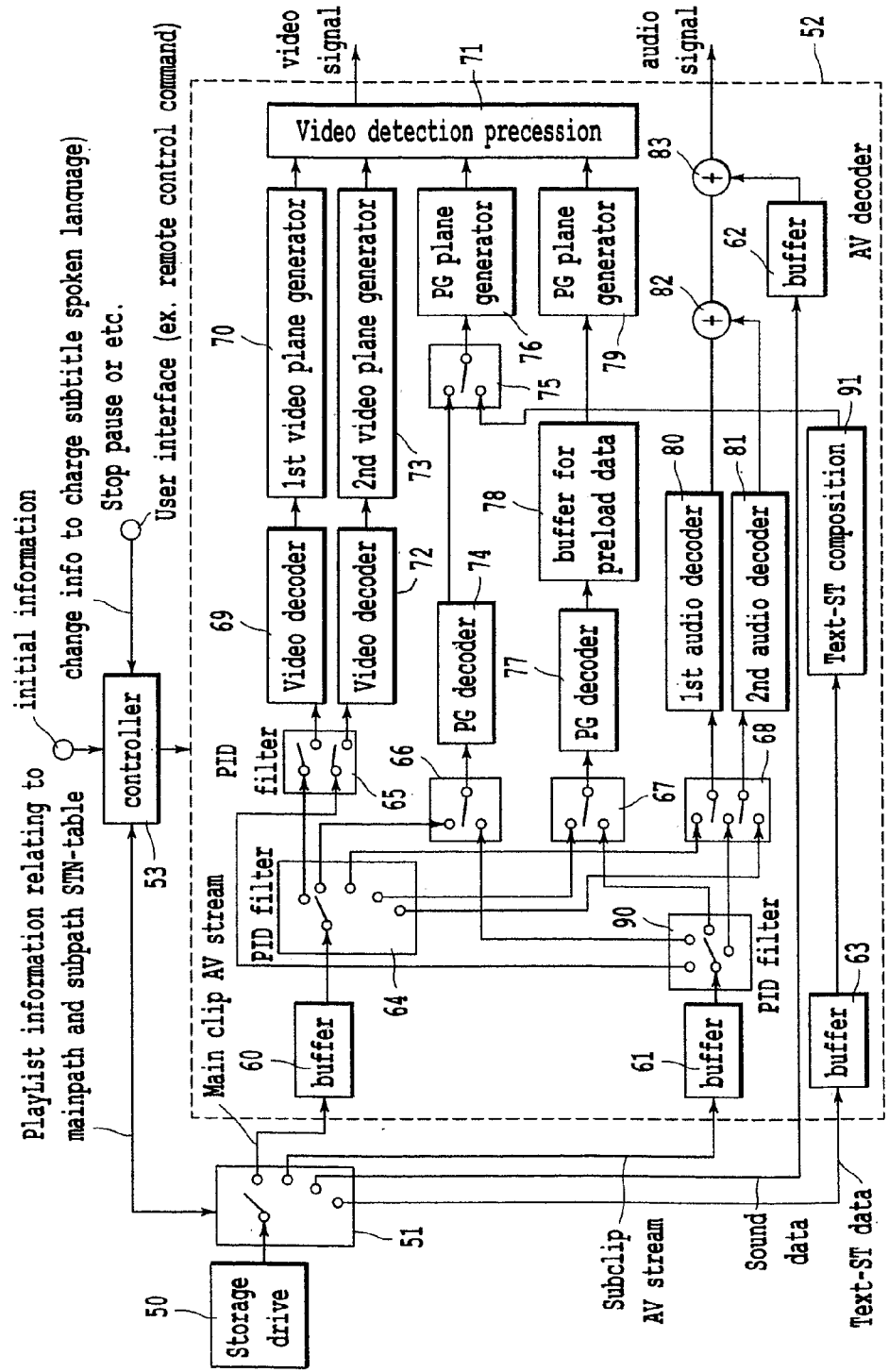
FIG. 30 is a general block diagram of a reproducing apparatus.

Next, we explain the reproduction apparatus which can play above example. FIG. 30 shows an example of reproducing apparatus 1. Apparatus 1 has storage drive 50, switch circuit 51, AV decoder portion 52 and controller 53. The storage drive is an optical drive for BD-ROM disc. Furthermore storage drive may optional include a hard disc or non volatile memory storing content data also.

The controller 53 includes a CPU (central Processing Unit), ROM (read only memory) which has pre stored program so as to comprise a computer program product, and RAM (Random Access Memory) to be used as a working memory when executing the program and controlling the overall operation of this reproduction apparatus 1. Controller 420 as explained using FIG. 27 is corresponding to this controller 53.

Reproduction apparatus 1 also has a user interface to send/receive user operation and output control signal corresponding to receive user operation. For example a remote commander to communicate with reproducing apparatus via infrared light or other communicating means is used as a user interface. Several input means are established on remote control commander, such as cross button to indicates up, down, right and left, number key, function key to execute predetermined function, such as pause, stop, fast forward and back forward. As an alternative, the user interface includes a set of buttons, and an optional display on the player itself.

Remote control commander generate control signals corresponding to these operations using such input mechanisms, and sends these control signals wirelessly such as by modulating an infra red signal. Reproduction apparatus 1 receives this infra red signal via a infra red signal receiver (not shown, or optionally included in the controller) and transforms this infra red signal into an electrical signal and demodulates it into the original control signal. This control signal is supplied to controller 53. The controller 53 then controls the reproduction apparatus 1 corresponding to control signal based on the execution of the program stored on ROM.

User interface can be not only remote control commander but also some switches on operation panel on reproduction apparatus 1. Furthermore, reproduction apparatus 1 can have a communicating mechanism using a LAN (Local Area Network) and supply signal from an external computer via this communicating mechanism to controller 53.

Furthermore initial information of language setting is memorized in a register such as non-volatile memory. This initial information of language setting is supplied to controller 53 from memory read when user turns on reproduction apparatus 1.

When a disc is inserted in storage drive 50, controller 53 reads "index.bdmv" and "MovieObject.bdmv" from the disc via storage drive 50. Controller 53 reads the PlayList file on "PlayList" directory based on description of these read file, and reads information relating to main path, sub path, and STN_table( ) block. Controller 53 reads the clip AV stream referred by PlayItem included in PlayList file from the disc via the storage drive 50. Furthermore controller 53 read clip AV stream referred by SubPlayItem included in PlayList file from disc via storage drive 50 in the case the PlayList file includes SubPlayItem.

Controller 53 analyzes information in the PlayList file and judges the subpath type based on SubPath_type corresponding to main path, and based on judgment, selects whether to operate the interactive graphics decoder 77 based on STC or free run clock CLK.

Hereinafter, the clip AV stream corresponding to the SubPlayItem is described as a sub clip AV stream and the call clip AV stream corresponding to PlayItem as main clip AV stream.

Data from storage drive 50 is processed through demodulation and error correction processing by modulation portion and error correcting portion (not shown in figure) and restored in a multiplexed stream. This multiplexed stream is a time divided and the multiplexed transport stream which includes a plurality of transport packets with fixed data length and data type identified by PID. This multiplexed stream is supplied into switch 51. Controller 53 classifies transport packets based on PID and control switch 51. Packets of the main clip AV stream are supplied into buffer 60 and Packets of sub clip AV stream are supplied into buffer 61. Packets of sound data are supplied into buffer 62. Packets of test data are supplied into buffer 63.

Packets stored in buffer 60 are read from buffer 60 based on control of controller 53 and supplied to PID filter 64. PID filter 64 classifies video packets, packets of PG stream, packets of IG stream and packets of audio stream.

In similar way, packets stored in buffer 61 are read from buffer 61 based on control of the controller 53 and supplied to PID filter 90. PID filter 90 classifies video packets, packets of PG stream, packets of IG stream and packets of audio stream.

Video packet separated by PID filter 64 and Video packet separated by PID filter 90 are supplied into PID filter 65 and classified based on PID. That is to say, PID filter 65 supply packets of main clip AV stream into $1^{st}$ video decoder 69 and supply packets of sub clip AV stream into $2^{nd}$ video decoder 72.

$1^{st}$ video decoder 69 extracts video data from a payload of a packet, and decodes it according to a predetermined decompression method, such as MPEG 2 and H264/AVC. Output from the $1^{st}$ video decoder 69 is supplied to a $1^{st}$ video plane generator 70 and generates a video plane. The video plane is generated by recording one frame of digital video data into frame memory. The video plane generated by the $1^{st}$ video plane generator 70 is supplied to a video data processor 71.

$2^{nd}$ video decoder 72 and $2^{nd}$ video plane generator 73, which follow similar processes to those described above with respect to the $1^{st}$ video decoder 69 and $1^{st}$ video plane generator 70, generate video plane. The video plane generated in $2^{nd}$ video plane is supplied into video data processor 71.

Video decoder 403 explained using FIG. 27 corresponds to $1^{st}$ video decoder 69. Video decoder 403 can correspond to $1^{st}$ and $2^{nd}$ video decoder 69, 72. Furthermore in this figure STC 400 and switch 411 in FIG. 27 is omitted.

Video data processing module 71 generates a composite video plane that combines the video plane generated by the $1^{st}$ video plane generator 70 and the video plane generated by $2^{nd}$ video plane generator 73 into one frame. It is possible to make a video plane using video planes generated by $1^{st}$ video plane generator 70 or video plane generated by $2^{nd}$ video plane generator 73 selectively. This video plane is corresponds to video plane 10 shown in FIGS. 9A and 9B.

Packets of the PG stream are classified by PID filter 64 and PID filter 90 and are supplied to switch circuit 66, where packets are selected and supplied to presentation graphics decoder 74. Presentation graphics decoder 74 extracts PG data from the payload of packets and decodes it to generate graphics data to represent subtitles to be supplied to switch circuit 75.

Switch circuit 75 selects one of graphics data and text subtitle data and supplies the same to presentation graphics plane generator 76. Presentation graphics plane generator 76 generates the presentation graphics plane and supplied it to video data processing 71. This presentation graphics plane corresponds to the subtitle plane described in FIGS. 9A and 9B as an example.

Packets of the IG stream are classified by PID filter 64 and PID filter 90 are supplied to switch circuit 67 and packets from PID filter 64 or filter 90 selected and supplied to interactive graphics decoder 74. Interactive graphics decoder 77 reconstructs PES packets from extracted data from payload of supplied packets. And based on header information, ICS, PDS and ODS of IG stream are extracted. ICS and PDS is stored in buffer called as CB (composition buffer). ODS is memorized in buffer called as DB (Decoded Buffer). For example preload buffer 78 corresponds to CB and DB.

Furthermore, PES packets have PTS which is time manage information relating to playback output and DTS, which is time management information relating to decoding. Menu display by IG stream is displayed based on PTS included in PES packet. For example, each data comprised of IG stream and memorized in preload buffer is controlled to be read on time based on PTS. One of STC and free run clock CLK is used as time information which PTS is based on. When the free run clock CLK is used as the basis for PTS, then the menu display is asynchronous with output of $1^{st}$ and $2^{nd}$ video decoder 69 and 72.

Data from IG stream read from pre-load buffer 78 is supplied to interactive graphics plane generator 79 and interactive graphics plane is generated. Interactive graphics plane corresponds to the graphics plane 12.

Video data processor 71 has a graphics processor as explained in FIG. 22, and mixes supplied video plane (moving picture plane 10 in FIG. 22), presentation graphics plane (subtitle plane 11 in FIG. 22) and interactive graphics plane (graphics plane 12 in FIG. 22) to create one composite image data and output video signal for display on a display, or Television.

Audio streams classified by PID filter 64 and 90 are supplied to switch circuit 68. Switch circuit 68 selects one of these supplied streams and supplies one to $1^{st}$ audio decoder 80 and the other to $2^{nd}$ audio decoder 81. Audio streams decoded by $1^{st}$ audio decoder 80 and $2^{nd}$ audio decoder 81 are mixed by adder 81 and further are mixed by adder 82 with sound data read from buffer 62.

Text data read from buffer 63 is processed by text-ST composition and is supplied to switch 75.

Although the present description used many hardware features to describe functionality, it should be understood this reproduction apparatus can be implemented more or all software implemented on a general purpose, or special purpose hardware platform. In the case of the reproduction apparatus being implemented on a computer, the apparatus includes both a hardware portion and a software portion. For example some decoders on reproduction apparatus 1, especially $1^{st}$ video decoder 69 and $2^{nd}$ video decoder 72 are processor intensive and so it is possible to make some processes which require high processing ability as hardware, and make other parts as software.

The programs that run on a computer to make a reproduction apparatus 1 comprising only software or a hybrid mix of hardware and software may be provided by, such as distributing CD-ROM (Compact Disc Read Only Memory), DVD- ROM (Digital Versatile Disc Read Only Memory), BD-ROM (BLU-RAY Disc Read Only Memory) and by using the internet. Once installed on the computer, the computer can peform predetermined processing as described above. Any one of the SONY VAIO (Trademark) personal computers could serve as the host for such software operations.

DESCRIPTION OF REFERENCE NUMERALS

1 REPRODUCING APPARATUS
10 MOVING PICTURE PLANE.
11 SUBTITLE PLANE
12 INTERACTIVE GRAPHICS PLANE
201A, 201B AND 203C BUTTON
202 PULL DOWN MENU
203A, 203B AND 203C BUTTON
400 STC PORTION
401 FREE RUN CLOCK
402 IG DECODER
403 VIDEO DECODER
410 FIRST SWITCH
411 SECOND SWITCH
420 CONTROLLER

The invention claimed is:

1. A reproducing apparatus, comprising:
a reference signal unit configured to output a reference signal;
an acquiring unit configured to acquire
a first stream of data that represents a main image to be reproduced on a display under control of said reference signal,
a second stream of data that represents a menu to be displayed with said main image, said second stream being asynchronous with said first stream, and said menu including an item that is user-selectable; and
reproducing control information;
an operation receiving unit to receive an operation request when the item in said menu is selected; and
a reproducing control unit configured to control reproduction of said main image from said first stream, and the menu from said second stream based on said reproducing control information,
wherein the reproducing control unit is configured to display the main image as a video and to simultaneously display the menu; and
said reproducing control unit is configured to pause reproduction of the video in response to acquiring a first portion of the reproducing control information, and to control the operation receiving unit to execute, while the video is paused, a computer-implemented operation in response to the item in said menu being selected.

2. The reproducing apparatus according to claim 1 wherein:
said reproducing control information includes information indicating a characteristic description of another stream corresponding to said first stream; and
said reproducing control unit is configured to determine whether said another stream is said second stream.

3. The reproducing apparatus according to claim 1, further comprising:
a clock signal outputting unit configured to output a clock signal that is independent of said reference signal,
wherein said reproducing control unit is configured to control said second stream using said clock signal at least when said operating receiving unit receives as an operation request a request to pause reproduction of said main image.

4. The reproducing apparatus according to claim 3, wherein:
said first stream of data is stored on an optical disc and represents a high definition video image;
said second stream of data is stored on the optical disc and represents the menu; and
said item is at least one of a subtitle and a language setting.

5. A computer-implemented method of reproducing an image and a menu on a display comprising:
outputting a reference signal,
acquiring
a first stream of data that represents a main image to be reproduced on the display under control of said reference signal,
a second stream of data that represents a menu to be displayed with said main image, said second stream being asynchronous with said first stream, and said menu including an item that is user-selectable; and
reproducing control information;
reproducing said main image from said first stream, and reproducing said menu from said second stream based on said reproducing control information;
displaying said main image as a video, and simultaneously displaying said menu;
pausing said video in response to acquiring a first portion of said reproducing control information; and
selecting the item in said menu in response to acquiring a second portion of said reproducing control information, and executing, while the video is paused, a computer-implemented operation in response to the item being selected in said selecting step.

6. The method according to claim 5, wherein said reproducing control information includes information indicating a characteristic description of another stream corresponding to said first stream, and said method further comprising:
determining whether said another stream is said second stream.

7. The method according to claim 5, further comprising:
outputting a clock signal that is independent of said reference signal; and
controlling said second stream using said clock signal at least when said pausing step pauses the video.

8. The method according to claim 7, wherein:
said acquiring step includes acquiring said first stream of data from an optical disc;
said displaying step includes displaying said main image as a high definition video image;
said acquiring step further includes acquiring said second stream of data from said optical disc; and
said item being at least one of a subtitle and a language setting.

9. A non-transitory recording medium on which computer readable instructions are encoded such that when executed by a processor implement a method comprising:
outputting a reference signal,
acquiring
a first stream of data that represents a main image to be reproduced on the display under control of said reference signal,
a second stream of data that represents a menu to be displayed with said main image, said second stream being asynchronous with said first stream, and said menu including an item that is user-selectable; and
reproducing control information;
reproducing said main image from said first stream, and reproducing said menu from said second stream based on said reproducing control information;

outputting said main image as a video, and simultaneously outputting said menu for display on a display;

pausing said video in response to acquiring a first portion of said reproducing control information; and selecting the item in said menu in response to acquiring a second portion of said reproducing control information, and executing, while the video is paused, a computer-implemented operation in response to the item being selected in said selecting step.

10. The recording medium according to claim 9, wherein said reproducing control information includes information indicating a characteristic description of another stream corresponding to said first stream, and said method further comprising:

determining whether said another stream is said second stream.

11. The recording medium according to claim 9, further comprising:

outputting a clock signal that is independent of said reference signal; and controlling said second stream using said clock signal at least when said pausing step pauses the video.

12. The recording medium according to claim 11, wherein:

said acquiring step includes acquiring said first stream of data from an optical disc;

said outputting step includes outputting said main image as a high definition video image;

said acquiring step further includes acquiring said second stream of data from said optical disc; and said item being at least one of a subtitle and a language setting.

13. A reproducing apparatus, comprising:

a reference signal unit configured to output a reference signal;

an acquiring unit configured to acquire a first stream of data that represents a main image to be reproduced on a display under control of said reference signal, a second stream of data that represents a menu to be displayed with said main image, said second stream being asynchronous with said first stream, and said menu including an item that is user-selectable, and reproducing control information;

means for reproducing said main image from said first stream, and for reproducing said menu from said second stream based on said reproducing control information;

a video data processor configured to output said main image as a video and to output simultaneously said menu for display on a display, wherein the means for reproducing is configured to pause said video in response to acquiring a first portion of said reproducing control information, to select the item in said menu in response to acquiring a second portion of said reproducing control information, and to execute, while the video is paused, an operation in response to the item being selected.

14. The reproducing apparatus according to claim 13 wherein:

said reproducing control information includes information indicating a characteristic description of another stream corresponding to said first stream; and said means for reproducing determines whether said another stream is said second stream.

15. The reproducing apparatus according to claim 13 further comprising:

a clock signal outputting unit that is independent of said reference signal, wherein said means for reproducing reproduces said second stream using said clock signal at least when a request to pause reproduction of said main image is received.

16. The reproducing apparatus according to claim 15, wherein:

said first stream of data is stored on an optical disc and represents a high definition video image;

said second stream of data is stored on the optical disc and represents the menu; and said item is at least one of a subtitle and a language setting.

* * * * *